US009095809B2

(12) United States Patent
Deckman et al.

(10) Patent No.: US 9,095,809 B2
(45) Date of Patent: Aug. 4, 2015

(54) SELECTIVATION OF ADSORBENTS FOR GAS SEPARATION

(71) Applicants: Harry W. Deckman, Clinton, NJ (US); Peter I. Ravikovitch, Princeton, NJ (US); Preeti Kamakoti, Summit, NJ (US); Chris Yoon, Asbury, NJ (US)

(72) Inventors: Harry W. Deckman, Clinton, NJ (US); Peter I. Ravikovitch, Princeton, NJ (US); Preeti Kamakoti, Summit, NJ (US); Chris Yoon, Asbury, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 14/074,860

(22) Filed: Nov. 8, 2013

(65) Prior Publication Data
US 2014/0157984 A1 Jun. 12, 2014

Related U.S. Application Data

(60) Provisional application No. 61/734,012, filed on Dec. 6, 2012, provisional application No. 61/734,007, filed on Dec. 6, 2012, provisional application No. 61/734,010, filed on Dec. 6, 2012.

(51) Int. Cl.
B01D 53/04 (2006.01)
B01D 53/047 (2006.01)
B01D 69/14 (2006.01)
B01J 20/30 (2006.01)
C01B 39/48 (2006.01)
B01D 53/02 (2006.01)
C01B 37/02 (2006.01)

(52) U.S. Cl.
CPC ............... B01D 53/04 (2013.01); B01D 53/02 (2013.01); B01D 53/047 (2013.01); B01D 53/0423 (2013.01); B01D 53/0462 (2013.01); B01D 53/0473 (2013.01); B01D 69/147 (2013.01); B01J 20/3078 (2013.01); C01B 37/02 (2013.01); C01B 39/48 (2013.01); B01D 2253/108 (2013.01); B01D 2256/245 (2013.01); B01D 2257/102 (2013.01); B01D 2257/504 (2013.01); Y02C 10/08 (2013.01)

(58) Field of Classification Search
CPC .... B01D 53/02; B01D 53/04; B01D 53/0462; B01D 53/047; B01D 53/0473; B01D 53/22; B01D 53/228; B01D 67/0093; B01D 69/147; B01D 2253/108; B01D 2256/245; B01D 2257/504
USPC ............... 95/45, 47, 49, 50, 51, 96, 128, 130, 95/135, 136, 139, 141, 143; 96/4, 108
See application file for complete search history.

(56) References Cited

U.S. PATENT DOCUMENTS

| 4,698,217 | A | 10/1987 | Valyocsik |
| 5,039,641 | A * | 8/1991 | Vansant et al. ................... 502/85 |
| 5,200,377 | A | 4/1993 | Zones et al. |
| 5,425,933 | A | 6/1995 | Nakagawa |
| 6,051,517 | A * | 4/2000 | Funke et al. ...................... 95/45 |
| 6,767,384 | B1 * | 7/2004 | Vu et al. ............................ 95/45 |
| 7,255,725 | B2 | 8/2007 | Chau et al. |
| 8,067,327 | B2 | 11/2011 | Li et al. |
| 2006/0079725 | A1 * | 4/2006 | Li et al. ......................... 585/818 |
| 2006/0169142 | A1 | 8/2006 | Rode et al. |
| 2008/0105627 | A1 | 5/2008 | Isomura |
| 2008/0282884 | A1 | 11/2008 | Kelley et al. |
| 2008/0282885 | A1 * | 11/2008 | Deckman et al. ................. 95/98 |
| 2008/0282886 | A1 | 11/2008 | Reyes et al. |
| 2008/0282892 | A1 | 11/2008 | Deckman et al. |
| 2009/0007780 | A1 * | 1/2009 | Yajima et al. ....................... 96/4 |
| 2009/0111959 | A1 | 4/2009 | Cao et al. |
| 2010/0018926 | A1 | 1/2010 | Liu et al. |
| 2011/0094380 | A1 * | 4/2011 | Li et al. ............................ 95/51 |
| 2011/0146606 | A1 * | 6/2011 | Cannella ....................... 123/1 A |

FOREIGN PATENT DOCUMENTS

EP 0255770 A2 2/2008

OTHER PUBLICATIONS

Olson et al, "Light hydrocarbon sorption properties of pure silica Si-CHA and ITQ-3 and high silica ZSM-58", Microporous and Mesoporous Materials, 2004, pp. 27-33, vol. 67, Science Direct, Elsevier Inc.
Zheng et al, "Synthesis, characterization, and modification of DDR membranes grown on alpha-alumina supports", Journal of Materials Science, 2008, pp. 2499-2502, vol. 43, Springer Science+Business Media, LLC.
Den Exter et al, "Separation of Permanent Gases on the All-Silica 8-Ring Clathrasil DD3R", Zeolites and Related Microporous Materials: State of the Art 1994, Studies in Surface Science and Catalysis, 1994, pp. 1159-1166, vol. 84, Elsevier Science B.V.
Tomita et al, "Gas separation characteristics of DDR type zeolite membrane," Microporous and Mesoporous Materials, 2004, pp. 71-75, vol. 68, Science Direct, Elsievier Inc.
Potapova, "Synthesis and characterization of the DDR type zeolite" (Master Thesis), Lulea University of Technology, Department of Chemical Engineering and Geosciences, Division of Chemical Technology, Jun. 2007.

(Continued)

Primary Examiner — Jason M Greene
(74) Attorney, Agent, or Firm — David M. Weisberg; Andrew T. Ward

(57) ABSTRACT

Systems and methods are provided for improving separation of gas phase streams using an adsorbent, such as 8-member ring zeolite adsorbents or DDR type zeolite adsorbents. Suitable gas phase streams can include at least one hydrocarbon, such as methane or a hydrocarbon containing at least one saturated carbon-carbon bond, and at least one additional component, such as $CO_2$ or $N_2$. The selectivity of the adsorbent is improved by selectivating the adsorbent with one or more barrier compounds. The presence of the barrier compounds is believed to alter the relative ability of potential adsorbates to enter into and/or move within the pores of the adsorbent.

18 Claims, 4 Drawing Sheets

(56) References Cited

OTHER PUBLICATIONS

Himeno et al., "Methane and Carbon Dioxide Adsorption on the All-Silica DD3R Zeolite", ZMPC2006, p. 2036 (2006).

Himeno et al., "Characterization and selectivity for methane and carbon dioxide adsorption on the all-silica DD3R zeolite", Microporous and Mesoporous Materials, Jan. 5, 2007, pp. 62-69, vol. 98, issues 1-3, ScienceDirect, Elsevier.

International Search Report with Written Opinion for PCT/US2013/069060 dated Apr. 8, 2014.

International Search Report with Written Opinion for PCT/US2013/069080 dated Apr. 17, 2014.

Ernst et al., "Hydrothermalsynthese des Zeoliths ZSM-58 and templatfreie Synthese von Zeolith ZSM-5", Chemie Ingenieur Technik, Jul. 1, 1991, vol. 63, No. 7, pp. 748-750.

Kumita et al., "Shape selective methanol to olefins over highly thermostable DDR catalysts", Applied Catalysis A: General, Jul. 13, 2010, vol. 391, No. 1, pp. 234-243, Elsevier.

International Search Report with Written Opinion for PCT/US2013/069073 dated May 6, 2014.

Office Action from related U.S. Appl. No. 14/074,918 dated Jun. 8, 2015.

* cited by examiner

SELECTIVATION OF ADSORBENTS FOR GAS SEPARATION

CROSS-REFERENCE TO RELATED APPLICATIONS

This application claims the benefit of U.S. Application Ser. No. 61/734,012, filed on Dec. 6, 2012; which is incorporated by reference herein in its entirety. This application is also related to U.S. Application Ser. Nos. 61/734,007 and 61/734,010, also filed on Dec. 6, 2012, and the two other co-pending U.S. utility patent applications filed on even date herewith and claiming priority thereto, respectively, all of which are hereby incorporated by reference herein in their entirety.

FIELD OF THE INVENTION

Systems and methods are described for performing gas separation using adsorbent materials.

BACKGROUND OF THE INVENTION

Removal of contaminants or impurities from a gas phase stream is a commonly encountered process in petroleum and natural gas processing. For example, many natural gas streams contain at least some $CO_2$ in addition to the desired $CH_4$. Additionally, many refinery processes generate a gas phase output that includes a variety of species, such as $CH_4$ and $CO_2$, that are gases at standard temperature and pressure. Performing a separation on a gas phase stream containing $CH_4$ can allow for removal of an impurity and/or diluent such as $CO_2$ or $N_2$ under controlled conditions. Such an impurity or diluent can then be directed to other processes, such as being directed to another use that reduces the loss of greenhouse gases to the environment.

U.S. Patent Application Publication No. 2008/0282885 describes systems and methods for removing $CO_2$, $N_2$, or $H_2S$ using a swing adsorption process. One type of adsorbent that can be used in the swing adsorption process is an 8-ring zeolite, such as a DDR type zeolite.

U.S. Pat. No. 7,255,725 describes a porous inorganic membrane containing carbon and a process for use of such a membrane. A porous carbon-free inorganic membrane (such as a zeolite) is treated with a hydrocarbon-type feed under temperature and time conditions that are suitable for depositing carbon by chemical reaction on the inorganic membrane. The carbon-containing membrane is then maintained at a temperature higher than the deposition temperature for a period of time prior to performing a membrane separation. The membrane is described as being useful for separating non-condensable gases, such as $CO_2$, $CH_4$, or $H_2$, from a hydrocarbon feed.

International Publication No. WO 2006/017557 describes membranes for highly selective separations. After calcination, a molecular sieve membrane such as SAPO-34 is treated with a modifying agent such as ammonia. Such a treated membrane is described as being suitable for improving membrane separation of $CO_2$ from $CH_4$ where the amount of $CH_4$ in a permeate through the membrane is reduced. Other modifying agents are described as silanes and/or amines that react with acid sites of zeolites, and polar compounds such as ethanol.

SUMMARY OF THE INVENTION

In one aspect, a method for performing a gas separation is provided. The method includes contacting an adsorbent or membrane comprising an 8-member ring zeolite or other 8-member ring microporous material with a barrier compound under effective conditions to selectivate the adsorbent or membrane, the barrier compound having a minimum dimension of at least about 4.05 Angstroms and a maximum dimension of about 25 Angstroms or less; contacting the selectivated adsorbent or membrane with an input gas stream containing a first component and a second component to form a first gas stream enriched in the first component relative to the input gas stream; and collecting a second gas stream enriched in the second component relative to the input gas stream.

In another aspect, a method for performing a gas separation in a swing adsorber unit is provided. The method includes contacting an adsorbent comprising an 8-member ring zeolite or other 8-member ring microporous material in a swing adsorber unit with a barrier compound under effective conditions to selectivate the adsorbent, the 8-member ring zeolite being a DDR type zeolite, ZSM-58, Sigma-1, or a combination thereof; contacting the selectivated adsorbent with an input gas stream containing a first component and a second component to form an output gas stream enriched in the first component relative to the input gas stream, the selectivated adsorbent adsorbing at least a portion of the second component during the contacting; desorbing at least a portion of the adsorbed second component to form a desorbed second component portion; and collecting a gas stream comprising at least a portion of the desorbed second component portion, the gas stream being enriched in the second component relative to the input gas stream.

In yet another aspect, a method for performing a gas separation in a swing adsorber unit is provided. The method includes contacting an adsorbent comprising a microporous material in a swing adsorber unit with a barrier compound under effective conditions to selectivate the adsorbent, the microporous material having pores characterized by a first dimension of a largest hard sphere that can diffuse along any direction in the pores and the barrier compound having a second dimension representing a minimum dimension of the compound, wherein the second dimension is between 10% greater than and 60% greater than the first dimension; contacting the selectivated adsorbent with an input gas stream containing a first component and a second component to form an output gas stream enriched in the first component relative to the input gas stream, the selectivated adsorbent adsorbing at least a portion of the second component during the contacting; desorbing at least a portion of the adsorbed second component to form a desorbed second component portion; and collecting a gas stream comprising at least a portion of the desorbed second component portion, the gas stream being enriched in the second component relative to the input gas stream.

DETAILED DESCRIPTION OF THE EMBODIMENTS

Overview

Figure 1:
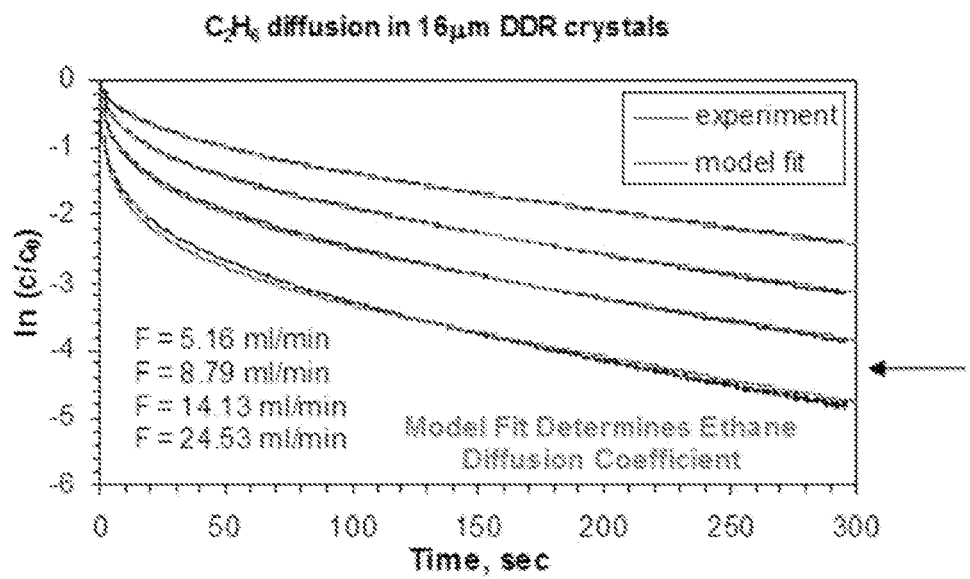
FIGS. 1 and 2 show zero length chromatography results for diffusion of gases under various conditions.

In various aspects, systems and methods are provided for improving separation of gas phase streams using an adsorbent, such as a kinetically selective adsorbent. In the discussion herein, kinetically selective adsorbents refer to adsorbents with different diffusion coefficients with regard to the rate of transport of at least a first compound relative to a at least a second compound. An example of a suitable adsorbent is an 8-member ring zeolite adsorbent, such as a DDR type zeolite. Suitable gas phase streams can include at least one hydrocarbon, such as methane or a (gaseous) hydrocarbon containing at least one saturated carbon-carbon bond, and at least one additional component, such as $CO_2$ or $N_2$. Without being bound by any particular theory, it is believed that the selectivity of the adsorbent can be improved by the barrier compounds being inserted into (or at least blocking) the pore structure of an adsorbent material. By entering (blocking) the pore structure, the barrier compounds can influence the effective pore mouth area and/or pore volume available for entry of a potential adsorbate into an adsorbent material. Thus, even though two potential adsorbates may have sizes suitable for adsorption into the pore network of an adsorbent, the presence of the barrier compounds can alter the relative ability of the different potential adsorbates to enter into and/or move within the pores of the adsorbent. Optionally, the barrier compounds may also contribute to formation of a layer on the surface of the adsorbent. Such an optional layer of barrier compounds may also alter the ability of potential adsorbates to enter (block) the pores of an adsorbent material. It is further noted that, while the above description relates to modifying the kinetics of entry of compounds into an adsorbate, similar methods can be used to modify the kinetics of entry of compounds into a membrane, e.g., based on an 8-member ring zeolite structure.

More generally, suitable adsorbents for separation of gas phase streams can include microporous materials (including zeolites), such as SAPO materials or other types of structures including framework atoms other than Si and Al in a zeolite-type framework structure. Additionally, microporous materials (including zeolites) with frameworks having other ring sizes may form suitable adsorbents, such as zeolites or other microporous materials with 10-member ring structures, 12-member ring structures, or structures with rings of other numbers of atoms.

Preferably, the barrier compounds can alter the kinetics for entry of a molecular species into the pores of the adsorbent (or membrane) while having a reduced or minimal impact on the adsorption (and/or membrane transport) of other targeted molecular species. This can allow a rate of adsorption for a desired adsorbate compound to be maintained while improving the selectivity against adsorption for adsorption of a different compound. In other embodiments, the kinetics for entry of both a desired adsorbate and another compound (or compounds) can be altered by the barrier compounds, with the alteration of the kinetics of the desired adsorbate being less than the alteration of the kinetics for the other compound(s), so that the selectivity for preferentially adsorbing the desired adsorbate compound can advantageously be improved. For example, $CH_4$ and $C_2H_6$ are examples of compounds where the adsorption kinetics can be impacted by the presence of certain barrier compounds. $N_2$ and $CO_2$ are examples of compounds that experience a reduced and/or minimized impact on adsorption kinetics due to the presence of certain barrier compounds. Thus, $N_2$ and $CO_2$ represent potential desired adsorbate compounds.

In swing adsorption and membrane separation processes, selectivation of an adsorbent material using barrier compounds can improve the selectivity of an adsorbent for adsorbing a first compound preferentially relative to a second compound. For example, this can allow a product stream of a desired hydrocarbon (such as $CH_4$ or $C_2H_6$) to include a greater yield of the desired hydrocarbon as well as an increased weight percentage of the desired hydrocarbon relative to an input gas stream. This can be achieved by preferentially decreasing the adsorption kinetics of the desired hydrocarbon relative to the adsorption kinetics of one or more other components of the input gas stream (such as $N_2$ or $CO_2$). Barrier compounds being inserted into (blocking) a pore network and/or forming a barrier layer for improving separation can be used, for example, in a swing adsorber apparatus for performing gas phase separations. Additionally, by slowing the rate at which a desired hydrocarbon diffuses into the adsorbent, the cycle time requirements for the adsorbent layer/material can be relaxed. This can allow for implementation of adsorption and regeneration cycles that may be more compatible with the timing required for operation of large scale valves and structured adsorbent beds. In a membrane separation application, the presence of a barrier compound can increase the relative likelihood for a component (such as $CO_2$ or $N_2$) to enter and diffuse through the membrane, as compared with the likelihood for another component (such as $CH_4$) to enter and diffuse through the membrane.

Preferably, the barrier layer does not significantly alter the adsorption capacity of the adsorbent (or desired permeate component). In a preferred embodiment, the presence of the barrier layer only reduces the adsorption capacity of the adsorbent by 40% or less, e.g., by less than 20% or by less than 10%. Even though the adsorption capacity can be somewhat reduced by the barrier layer, the performance of the adsorbent can improve, because of improvements in the kinetic selectivity.

Preferably, the barrier layer can be formed using a compound that slowly diffuses through the pore structure of the adsorbent. This can allow the formation of a relatively stable layer that does not require frequent regeneration or replenishment. By forming the barrier layer from a slowly diffusing compound, the layer can be concentrated in/among pores away from the center of the adsorbent (i.e., pores near the surface of the adsorbent). Having the barrier formed in/among pores near/on the surface of the adsorbent can help to improve the kinetic selectivity by immediately blocking or retarding the transport, and hence by decreasing the adsorption kinetics of the species to be kinetically excluded from the adsorbent. At the temperature of the desired separation process, the diffusion coefficient of the compound used to form the barrier layer can preferably be less than $10^{-15}$ m$^2$/s, e.g., less than $10^{-19}$ m$^2$/s or less than $10^{-23}$ m$^2$/s.

In some preferred embodiments, the adsorbent can preferentially adsorb a second compound relative to a first compound prior to (or without) use of barrier compounds. In such embodiments, use of barrier compounds can optionally further enhance the selectivity of the adsorbent in membrane or swing adsorption processes. In other embodiments, barrier compounds can be used for adsorbents that otherwise have little or no adsorption selectivity for a second compound relative to a first compound. In such other embodiments, use of barrier compounds can introduce selective adsorption into an adsorbent system.

Depending on the embodiment, a blocking compound can be introduced to an adsorbent to form a barrier layer at various times. One option can be to introduce the blocking compound after synthesizing the adsorbent crystals but before incorporating the crystals into a contactor or bed structure. Another option can be to introduce the blocking compound after forming an adsorbent bed incorporating the crystals. Still another option can be to introduce the blocking compound after an adsorbent bed incorporating the crystals is used to construct a contactor, such as a swing adsorption vessel.

Removal of $CO_2$ from a stream containing small hydrocarbons can be beneficial for a variety of reasons. For example, in a stream being used as a fuel for combustion, $CO_2$ can act as an inert diluent. Too much $CO_2$ in a fuel stream can inhibit a combustion reaction. Natural gas for sale as a fuel can often have a specification on the maximum amount of diluents present. In some embodiments, the amount of inerts present in a natural gas stream can preferably be about 2 vol % or less. Additionally, any $CO_2$ that enters into a combustion reaction can add to the greenhouse gases generated by the reaction. It can also be beneficial to remove $N_2$ from a methane-containing stream (or another stream containing small hydrocarbons), as $N_2$ can also act as an inert diluent during combustion. In addition to acting as a diluent in a fuel stream, high levels of $CO_2$ and/or $N_2$ may increase the difficulty in liquefying a methane-containing stream, such as a natural gas stream.

Separation Processes

This invention can be applicable to membrane as well as swing adsorption processes. Membranes can be formed from adsorbent materials. For example hydrothermal synthesis processes can produce zeolite membranes. Zeolites can also be incorporated into mixed matrix membranes. In a membrane separation process, a flow of a feed mixture (typically in the gas phase) can be passed over one side of the membrane. The membrane can selectively transport some species to the opposite side of the membrane, which either can be at a lower pressure or can be purged. The species preferentially transported through the membrane is referred to as the heavy component, and the species preferentially retained on the feed side is referred to as the light component (regardless of their relative molar masses). A transport rate of molecules through the membrane can be determined by kinetics and equilibrium adsorption. Enhancing the kinetic selectivity by selectivation can improve the retention, and hence the recovery, e.g., of the light component.

All swing adsorption processes have an adsorption step in which a feed mixture (typically in the gas phase) is flowed over an adsorbent that preferentially adsorbs a more readily adsorbed component relative to a less readily adsorbed component. A component may be more readily adsorbed because of kinetic or equilibrium properties of the adsorbent. The adsorbent can typically be contained in a contactor that is part of the swing adsorption unit. The contactor can typically contain an engineered structured adsorbent bed or a particulate adsorbent bed. The bed can contain the adsorbent and other materials such as other adsorbents, mesopore filling materials, and/or inert materials used to mitigated temperature excursions from the heat of adsorption and desorption. Other components in the swing adsorption unit can include, but are not necessarily limited to, valves, piping, tanks, and other contactors.

The method of adsorbent regeneration designates the type of swing adsorption process. Pressure swing adsorption (PSA) processes rely on the fact that gases under pressure tend to be adsorbed within the pore structure of the microporous adsorbent materials. Typically, the higher the pressure, the greater the amount of targeted gas component that will be adsorbed. When the pressure is reduced, the adsorbed targeted component is typically released, or desorbed. PSA processes can be used to separate gases of a gas mixture, because different gases tend to fill the micropore or free volume of the adsorbent to different extents due to either the equilibrium or kinetic properties of the adsorbent. Temperature swing adsorption (TSA) processes also rely on the fact that gases under pressure tend to be adsorbed within the pore structure of the microporous adsorbent materials. When the temperature of the adsorbent is increased, the adsorbed gas is typically released, or desorbed. By cyclically swinging the temperature of adsorbent beds, TSA processes can be used to separate gases in a mixture when used with an adsorbent selective for one or more of the components in a gas mixture. Partial pressure purge displacement (PPSA) swing adsorption processes regenerate the adsorbent with a purge. Rapid cycle (RC) swing adsorption processes complete the adsorption step of a swing adsorption process in a short amount of time. For kinetically selective adsorbents, it can be preferable to use a rapid cycle swing adsorption process. If the cycle time becomes too long, the kinetic selectivity can be lost. These swing adsorption protocols can be performed separately or in combinations. Examples of processes that can be used in combination are RCPSA, RCTSA, PTSA, and PPTSA. Selectivation can be used to improve the performance of all swing adsorption processes.

Swing adsorption processes can be applied to remove a variety of target gases from a wide variety of gas mixtures. The "light component" as utilized herein is taken to be the species or molecular component(s) not preferentially taken up by the adsorbent in the adsorption step of the process. Conversely, the "heavy component" as utilized herein is taken to be the species or molecular component(s) preferentially taken up by the adsorbent in the adsorption step of the process.

The selectivation methods described herein can provide an improvement for kinetically controlled swing adsorption processes and, e.g., can increase the recovery of the light component. In kinetically controlled swing adsorption processes, at least a portion (and preferably a majority) of the selectivity can be imparted due to the transport diffusion coefficient in the micropores and free volume of the adsorbent of the light species being less than that of the heavier species. Also, in kinetically controlled swing adsorption processes with microporous adsorbents, such as 8-member ring zeolite adsorbents, the diffusional selectivity can arise from diffusion differences in the micropores of the adsorbent and/or from a selective diffusional surface resistance in the crystals or particles that make-up the adsorbent. Kinetically controlled swing adsorption processes are in contrast to equilibrium controlled swing adsorption processes, where the equilibrium adsorption properties of the adsorbent tend to control selectivity. The improvement in the kinetic selectivity can be such that the total recovery, e.g., of the light component introduced into the process, achieved in the swing adsorption process can be greater than about 80 mol %, e.g., greater than about 85 mol %, greater than about 90 mol %, or greater than about 95 mol %. Recovery of the light component can be defined as the time averaged molar flow rate of the light component in the product stream divided by the time averaged molar flow rate of the light component in the feedstream. Similarly, recovery of the heavy component can be defined as the time averaged molar flow rate of the heavy component in the product stream divided by the time averaged molar flow rate of the heavy component in the feedstream.

It is-possible to remove two or more contaminants simultaneously, but, for convenience, the component(s) to be removed by selective adsorption is(are) typically referred to herein in the singular and as a contaminant or heavy component.

The selectivation methods described herein can provide an improvement in the kinetic selectivity of the adsorbent material that can be translated through proper design into an improvement in desired component recovery in a kinetically controlled swing adsorption process and/or membrane separation process.

Adsorbent Contactors and Beds

The term "adsorbent contactor," as utilized herein, includes both structured and unstructured adsorbent contactors. The adsorbent contactor is the portion of the swing adsorption unit where the feed gas is contacted with the adsorbent. In a TSA process, the contactor may contain a means to heat and cool the adsorbent, such as heating and cooling channels. Each contactor can contain one or more adsorbent beds. Beds are sections or portions of the contactor that contain adsorbent. Each bed can contain a single adsorbent or a mixture of different adsorbents. All beds in a contactor do not have to contain the same adsorbent.

In some embodiments, the bed in the contactor can comprise a packing containing at least solid inert particles and pellets containing an adsorbent. The inert particles can be incorporated into the bed to help manage heat of adsorption and desorption. The pellets containing the adsorbent can typically include adsorbent particles, pores, and a binder. Pellets can often be formed in spray drying or extrusion processes. Inert particles can typically have dimensions ranging from about 100 microns to about 10 cm, but any suitable particle dimensions can be used, depending on design. Pellets containing the adsorbent can typically have dimensions ranging from about 250 microns to about 1 cm, but again any suitable particle dimensions can be used, depending on design. Mass transfer can be improved by using smaller sized pellets; however, pressure drop through the bed can tend to increase with decreasing size.

One example of an engineered adsorbent contactor is a parallel channel contactor, which can be suitable for use in a variety of swing adsorption processes. The bed structure for an adsorbent contactor composed of parallel channel contactors can include fixed surfaces on which the adsorbent or other active material is held. Parallel channel contactors can provide significant benefits over conventional gas separation methods, such as vessels containing adsorbent beads or extruded adsorbent particles. "Parallel channel contactors" are defined herein as a subset of adsorbent contactors comprising structured (engineered) adsorbents in beds with substantially parallel flow channels. These flow channels may be formed by a variety of means. In addition to the adsorbent material, the bed structure may contain one or more items such as, but not limited to, support materials, heat sink materials, and void reduction components.

In a swing adsorption apparatus with parallel contactor channels, the walls of the channels in the beds can contain the adsorbent, for example uniform sized 8-ring zeolite crystals. The beds in the contactor may optionally contain a thermal mass (heat transfer) material to help control heating and cooling of the adsorbent of the contactor during both the adsorption and desorption steps of a pressure swing adsorption process. Heating during adsorption can be caused by the heat of adsorption of molecules entering the adsorbent. The optional thermal mass material can also help control cooling of the contactor during the desorption step. The thermal mass can be incorporated into the flow channels of the beds in the contactor, incorporated into the adsorbent itself, and/or incorporated as part of the wall of the flow channels. When it is incorporated into the adsorbent, it can be a solid material distributed throughout the adsorbent layer and/or it can be included as a layer within the adsorbent. When it is incorporated as part of the wall of the flow channel, the adsorbent can be deposited or formed onto the wall. Any suitable material can be used as the thermal mass material in the practice of the present invention. Non-limiting examples of such materials include metals, ceramics, and polymers. Non-limiting examples of preferred metals include steel, copper, and aluminum alloys. Non-limiting examples of preferred ceramics include silica, alumina, and zirconia. An example of a preferred polymer that can be used in the practice of the present invention is a polyimide.

Depending upon the degree to which the temperature rise is to be limited during the adsorption step, the amount of thermal mass material used can range from about 0.1 to about 25 times the mass of the microporous adsorbent of the contactor, e.g., from about 0.25 to 5 times the mass, from about 0.25 to 2 times the mass, or from about 0.25 to 1 times the mass. In a preferred embodiment, an effective amount of thermal mass can be incorporated into the contactor. The effective amount of thermal mass can be an amount sufficient to maintain the thermal rise of the adsorbent during the adsorption step to less than about 100° C., e.g., less than about 50° C. or less than about 10° C.

Channels in contactors, also sometimes referred to as "flow channels" or "gas flow channels", are paths in the contactor that allow gas flow through. Generally, flow channels can provide for relatively low fluid resistance coupled with relatively high surface area. Flow channel length can advantageously be sufficient to provide the mass transfer zone, which length can be at least a function of the fluid velocity and of the surface area to channel volume ratio. The channels can be configured to minimize pressure drop along the length of channels. In many embodiments, a fluid flow fraction entering a channel at the first end of the contactor does not communicate with any other fluid fraction entering another channel at the first end until the fractions recombine after exiting at the second end. In parallel channel contactors, channel uniformity can be important in the beds to ensure that (substantially all of) the channels are being effectively utilized and that the mass transfer zone is substantially equally contained. Both productivity and gas purity can suffer if there is excessive channel inconsistency. If one flow channel is larger than an adjacent flow channel, premature product break through may occur, which can lead to a reduction in the purity of the product gas, in some cases to unacceptable purity levels. Moreover, devices operating at cycle frequencies greater than about 50 cycles per minute (cpm) can require greater flow channel uniformity and less pressure drop than those operating at lower cycles per minute. Further, if too much pressure drop occurs across the bed, then higher cycle frequencies, such as on the order of greater than 3 cpm, may not readily be achieved.

The dimensions and geometric shapes of the beds in parallel channel contactors can include any suitable for use in swing adsorption process equipment. Non-limiting examples of geometric shapes include various shaped monoliths having a plurality of substantially parallel channels extending from one end of the monolith to the other; a plurality of tubular members; stacked layers of adsorbent sheets with and without spacers between each sheet; multi-layered spiral rolls; bundles of hollow fibers; as well as bundles of substantially parallel solid fibers. The adsorbent can be coated onto these geometric shapes or the shapes can, in many instances, be formed directly from the adsorbent material plus suitable binder. An example of a geometric shape formed directly from the adsorbent/binder can be extrusion of a zeolite/polymer composite into a monolith. Another example of a geometric shape formed directly from the adsorbent can be extruded or spun hollow fibers made from a zeolite/polymer composite. An example of a geometric shape coated with the adsorbent can be a thin flat steel sheet coated with a microporous, low mesopore, adsorbent film, such as a zeolite film. The directly formed or coated adsorbent layer can be itself structured into multiple layers or the same or different adsorbent materials. Multi-layered adsorbent sheet structures are described, for example, in U.S. Patent Application Publication No. 2006/0169142, which is incorporated by reference herein.

The dimensions of the flow channels can be computed from considerations of pressure drop along the flow channel. It can be preferred for the flow channels to have a channel gap from about 5 microns to about 1 mm, e.g., from about 50 microns to about 250 microns. As utilized herein, the "channel gap" of a flow channel is defined as the length of a line across the minimum dimension of the flow channel as viewed orthogonal to the flow path. For instance, if the flow channel is circular in cross-section, then the channel gap is the internal diameter of the circle. However, if the channel gap is rectangular in cross-section, the flow gap is the distance of a line perpendicular to and connecting the two longest sides of the rectangle (i.e., the length of the smallest side of the rectangle). It should also be noted that the flow channels can be of any cross-sectional configuration. In some preferred embodiments, the flow channel cross-sectional configuration can be circular, rectangular, square, or hexagonal. However, any geometric cross-sectional configuration may be used, such as but not limited to, ellipses, ovals, triangles, various polygonal shapes, or even irregular shapes. In other preferred embodiments, the ratio of the adsorbent volume to flow channel volume in the adsorbent contactor can be from about 0.5:1 to about 100:1, e.g., from about 1:1 to about 50:1.

In some applications, the flow channels can be formed by laminating adsorbent sheets together. Typically, adsorbent laminate applications can have flow channel lengths from about 0.5 centimeter to about 10 meters, e.g., from about 10 cm to about 1 meter, and a channel gap of about 50 microns to about 450 microns. The channels may contain a spacer or a mesh that acts as a spacer. For laminated adsorbents, spacers can be used, which are structures or materials that define a separation between adsorbent laminates. Non-limiting examples of the type of spacers that can be used in the present invention include those comprised of dimensionally accurate: plastic, metal, glass, or carbon mesh; plastic film or metal foil; plastic, metal, glass, ceramic, or carbon fibers and threads; ceramic pillars; plastic, glass, ceramic, or metal spheres, or disks; or combinations or composites thereof. Adsorbent laminates have been used in devices operating at PSA cycle frequencies up to at least about 150 cpm. The flow channel length may be correlated with cycle speed. At lower cycle speeds, such as from about 20 cpm to about 40 cpm, the flow channel length can be as long as one meter or more, even up to about 10 meters. For cycle speeds greater than about 40 cpm, the flow channel length can typically be decreased and may vary, e.g., from about 10 cm to about 1 meter. Longer flow channel lengths can be used for slower cycle PSA processes. RCTSA processes tend to be slower than RCPSA processes, and, as such, longer flow channel lengths can also be used with TSA processes.

In an embodiment, at least one bed in the contactors within the swing adsorption unit can contain selectivated adsorbent. In various embodiments, the majority of the adsorbent contained within the bed in the contactors can be selectivated.

Gas Feeds and Adsorbent Materials

The separation methods described herein can be used to perform separations on a variety of gas phase feeds. One example of a gas phase feed includes a natural gas feed or stream, such as a natural gas feed produced at a petroleum production site, or a natural gas feed or stream from a gas field or shale gas formation. Natural gas feeds typically contain methane, optionally some larger hydrocarbons such as $C_2$-$C_4$ hydrocarbons, $CO_2$, and optionally one or more additional components such as $N_2$, $H_2S$, $H_2O$, and mercaptans. A natural gas feed may also contain one or more substances introduced as part of the process for extracting the natural gas at the production site. Non-limiting examples of such substances can include glycols such as ethylene glycol, amines such as methyl diethyl amine, dimethyl disulfide, and combinations thereof.

Improvements in the recovery of the light component created by selectivation of adsorbents or membranes can be valuable for processes used to remove impurities from natural gas streams, particularly high pressure natural gas streams. It can be desirable to recover the impurities, also referred to as the "heavy component(s)", and the methane-rich product, also referred to as the "light component", at as high a pressure as practical for operability in natural gas processing. Depending on the embodiment, a swing adsorption process using a selectivated adsorbent can be used to obtain methane recovery of greater than about 80 mol %, e.g., greater than about 85 mol %, greater than about 90 mol %, or greater than about 95 mol %, even when the natural gas is fed at relatively high inlet pressures, such as greater than about 50 psig (about 350 kPag), e.g., at least about 150 psig (about 1.0 MPag), at least about 450 psig (about 3.1 MPag), at least about 600 psig (about 4.1 MPag), or at least about 1200 psig (about 8.3 MPag). The composition of natural gas streams directly from an underground field (raw natural gas) can vary from field to field. In order to produce a gas that can be introduced into a pipeline for sale to residential and commercial fuel markets contaminants, such as $N_2$, Hg, mercaptans, and acid gases $CO_2$ and $H_2S$, should be removed to acceptable levels. The levels and impurity types vary from gas field to gas field and, in some cases, can comprise the majority of molecules in the produced gas. For example, it is not uncommon for some natural gas fields to contain from about 0 to about 90 mol % $CO_2$, more typically from about 10 mol % to about 70 mol % $CO_2$.

Other examples of suitable gas phase feeds can include a flue gas and/or a fuel gas from a refinery process. A variety of processes can generate a flue gas and/or fuel gas including $CO_2$ and small hydrocarbons such as $CH_4$. Depending on the source of the flue/fuel gas, it/they may also contain $H_2S$, $H_2$, $N_2$, $H_2O$, and/or other components that are gas phase at standard conditions. Components such as $CO_2$ and $N_2$ can act as diluents reducing the value of such flue gas and/or fuel gas streams.

In order to improve the value of a gas phase stream, a separation can be performed to generate at least two product streams. A first product stream corresponding to the light component can be enriched in a desired product, such as $CH_4$ and/or other hydrocarbons, such as other hydrocarbons generally, other hydrocarbons containing 4 or fewer carbon atoms, or other hydrocarbons containing 3 or fewer carbon atoms. Preferably, the other hydrocarbon can include at least one saturated carbon-carbon bond. A second product stream corresponding to the heavy component can be enriched in one or more rejected components, such as $CO_2$ and/or $N_2$.

One method for performing a separation can be to expose an input stream to an adsorbent material that can preferentially or selectively adsorb one or more components of a gas phase stream. Differences in adsorption can be due to either equilibria or kinetics. Differences in equilibria can be reflected in competitive adsorption isotherms and/or can be estimated from single component isotherms. Differences in kinetics can be reflected in diffusion coefficients. Processes in which a substantial portion of the selectivity arises from differences in kinetics are typically referred to as kinetic separations. For kinetic separations, the time of the adsorption step can preferably be short enough for the adsorbent not to equilibrate with the feed stream. As an example, relatively large pore (>5 Å average pore size) cationic zeolites can have an equilibrium selectivity allowing $CO_2$ to be adsorbed in preference to $CH_4$, while relatively small pore (<3.8 Å average pore size) cationic zeolites can have a kinetic selectivity allowing $CO_2$ to be adsorbed in preference to $CH_4$. A contactor made using a zeolite adsorbent can be used to selectively adsorb $CO_2$ from an input gas stream containing $CO_2$ and $CH_4$, resulting in an output stream enriched in $CH_4$. For a kinetic adsorbent, the time of the adsorption step can be set by the zeolite crystal size and the $CH_4$ diffusion coefficient. Regeneration of such a kinetic adsorbent can be done with a pressure swing, a temperature swing, a purge, and/or displacement. Use of a kinetic adsorbent that weakly adsorbs $CO_2$ (i.e., relatively flat adsorption isotherm) can facilitate regeneration. Highly siliceous zeolites (Si/Al ratio >~100) can often have these types of weak isotherms. A regeneration process can typically generate a stream enriched in $CO_2$ and depleted in hydrocarbons such as $CH_4$.

One consideration in choosing an adsorbent zeolite (or other adsorbent material) can be selectivity for a desired separation. Unless otherwise noted, the term "swing adsorption selectivity" as used herein is based on binary (pairwise) comparison of the molar concentration of components in a feed stream and the total number of moles of these components adsorbed by a particular adsorbent during the adsorption step of a process cycle under the specific system operating conditions and feed stream composition. This swing adsorption selectivity definition can be suitable for a process cycle that is part of a swing adsorption process, such as a type of pressure and/or temperature swing adsorption. In order to define the selectivity, uptake values for components in a feed can be determined. For a feed that contains at least components A and B, the adsorption uptake values for components A and B can be defined as: $U_A$={change in total moles of A in the adsorbent during the adsorption step of the swing adsorption process}/{molar concentration of A in the feed}; and $U_B$={change in total moles of B in the adsorbent during the adsorption step of the swing adsorption process}/{molar concentration of B in the feed}, where $U_A$ represents the adsorption uptake of component A and $U_B$ represents the adsorption uptake of component B.

For a feed containing component A, component B, and optionally one or more additional components, an adsorbent that has a greater "selectivity" for component A than component B can generally have at the end of the adsorption step of a swing adsorption process cycle a greater value for $U_A$ than $U_B$. Thus, the selectivity can be defined as: Swing Adsorption Selectivity=$U_A/U_B$ (for $U_A>U_B$). For adsorbents that are dominantly kinetically selective, the swing adsorption selectivity can depend on cycle time. In such cases, long adsorption, and hence overall, cycle times can decrease the swing adsorption selectivity.

Based on the above, suitable adsorbents can be operated with cycle times to have a swing adsorption selectivity of greater than 1 for a first component (e.g., component A) relative to a second component (e.g., component B) in a suitable swing adsorption unit. For example, a suitable adsorbent for separation of $CH_4$ from $CO_2$ can have a swing adsorption selectivity of greater than 1 for adsorption of $CO_2$ (component A) relative to $CH_4$ (component B). After selectivation the swing adsorption selectivity for a first component over a second component can be at least about 5, such as at least about 10. Some selectivations can have a swing adsorption selectivity for a first component over a second component of at least 25, e.g., at least 100.

Examples of components can include molecular nitrogen ($N_2$), carbon dioxide ($CO_2$), hydrogen sulfide ($H_2S$), and methane ($CH_4$). According to the definitions above, methane represents a component corresponding to a potential "second component" while nitrogen, carbon dioxide, or a combination thereof represent potential choices for the "first component". One option can be to selectivate an adsorbent (and/or the corresponding suitable swing adsorption unit) so that the swing adsorption selectivity for $CO_2$ over $CH_4$ is at least 5, e.g., at least 10, at least 25, or at least 100. Additionally or alternately, an adsorbent can be selectivated so that it has a swing adsorption selectivity for $N_2$ over $CH_4$ of at least 5, e.g., at least 10 or at least 25. Further additionally or alternately, an adsorbent can be selectivated to have a swing adsorption selectivity for a combination two or more of the above components relative to $CH_4$ of at least 5, e.g., at least 10 or at least 25 (for example, in such a situation, a first component can be selected from $CO_2$, $N_2$, or $H_2S$, and the second component can be $CH_4$). In all cases, the selectivation can advantageously increase the swing adsorption selectivity of the adsorbent.

Equilibrium selectivity may also be used as a factor in selecting an adsorbent. The methods described herein add kinetic selectivity onto the equilibrium selectivity in a way that can increase the swing adsorption selectivity of the adsorbent. Equilibrium selectivity can be characterized based on long time measurements of transport or based on slow speed cycle performance. For example, for the adsorption at ~40° C. of $CO_2$ using an 8-member ring DDR-type zeolite adsorbent, $CO_2$ can approach an equilibrium level of adsorbed molecules on a time scale (order of magnitude) of about 0.5 seconds to about 10 seconds for ~10 micron sized crystals. For this order of magnitude description, approaching an equilibrium level of adsorption is defined as being within about 5% of the equilibrium adsorption concentration, e.g., within about 2%. For $CH_4$, an equilibrium level of adsorbed molecules can usually be approached on a time scale on the order of tens of seconds. In other words, the equilibrium adsorbed concentration can be approached at a time between about 2 seconds and about 200 seconds. In a swing adsorption process with a relatively fast cycle time, such as a rapid cycle pressure and/or temperature swing adsorption process, the time in the adsorption step can be comparable to (or possibly shorter than) the time scale for $CH_4$ to approach an equilibrium level of adsorbed molecules. As a result, in a swing adsorption process with a cycle time on the order of tens of seconds or less, the adsorption of $CO_2$ and $CH_4$ can be influenced by different factors, e.g., for a 10 micron sized DDR adsorbent. The $CO_2$ adsorption can have characteristics with greater similarity to equilibrium adsorption, as the time scale for the swing adsorption cycle can be long relative to the time scale for equilibration of $CO_2$ adsorption. By contrast, kinetic adsorption factors can have a greater influence for $CH_4$ adsorption, as the time scale for the swing adsorption process can be roughly comparable to the time scale for $CH_4$ to reach equilibrium. As a result, selectivation can be used to increase kinetic selectivity by mitigating $CH_4$ adsorption and improving process latitude (by increasing allowable times spent in the adsorption step). $N_2$ can be similar to $CO_2$ in approaching equilibrium adsorption on a faster time scale than $CH_4$.

For the removal of $CO_2$, $N_2$, and/or $H_2S$ from natural gas or another gas stream that contains methane and/or other $C_2$-$C_4$ hydrocarbons, examples of suitable adsorbent materials can include 8-member ring zeolite materials that have a kinetic selectivity that can be improved with selectivation for separation of $CO_2$ and/or $N_2$ from the feed stream. An example of a suitable 8-member ring zeolite in this class of materials that can be used in swing adsorption processes is zeolite DDR. Other examples of 8-member ring zeolites include Sigma-1 and ZSM-58, which have isotypic framework structures to DDR. The 8-member ring zeolite materials can have a Si/Al ratio from about 1:1 to about 10000:1, e.g., from about 10:1 to about 5000:1 or from about 50:1 to about 3000:1.

8-member ring zeolites like DDR can typically have pore channels with a window (pore) size on the order of 3-4 Angstroms. For example, the window (pore) size for a DDR type zeolite is about 3.65 Angstroms. Molecules such as $CO_2$ and/or $N_2$, with a relatively linear configuration, can diffuse more rapidly in a pore with such a window size as compared to bulkier molecules, such as methane. As another example, the minimum dimension of methyldiethylamine is slightly less than 5 Angstroms.

In some embodiments, suitable 8-ring zeolite materials can allow $CO_2$ to be rapidly transmitted into zeolite crystals while hindering the transport of methane, so that it is possible to selectively separate $CO_2$ from a mixture of $CO_2$ and methane. With selectivation the swing adsorption selectivity can advantageously improve.

The 8-ring zeolites suitable for use herein can allow $CO_2$ to access the internal pore structure through 8-ring windows in a manner such that the ratio of the effective single component diffusion coefficients of $CO_2$ and methane (i.e., $D_{CO2}/D_{CH4}$) can be greater than 10, e.g., greater than about 50 or greater than about 100. Another consideration for cycle performance in natural gas separations can be the absolute methane diffusivity, methane being the light component in such kinetically controlled separations. In combination with the length of the adsorption step in the cyclic swing adsorption process, the absolute methane diffusivity can significantly impact methane recovery in kinetically controlled separations of gas mixtures containing $CO_2$ and $CH_4$. As previously mentioned, it can be advantageous to maximize this recovery. Process modeling has shown that, for a cycle with a ~4 second long adsorption step in a contactor made using ~15 micron size crystals, the effective methane diffusivity of crystals at process conditions can preferably be below about $3 \times 10^{-13}$ $m^2/s$, in order to avoid adsorbing too much methane and deleteriously impacting recovery targets. For other cycle times and/or crystals with other dimensions, the methane diffusivity $D_{CH4}$ can preferably be defined by $$D_{CH4} < 3 \times 10^{-13} * [t_{adsorb}/(4 \text{ seconds})]^2 * (d_{crystal}/(15 \text{ microns}))^2 \text{ \{in } m^2/s\}$$

where $t_{adsorb}$ is the time of the adsorption step in seconds and $d_{crystal}$ is the characteristic dimension in microns for transport through the crystal. These conditions for methane diffusivity cannot always be met with the combination of sizes of 8-ring zeolite crystals that can be synthesized, the diffusivity of as-synthesized crystals, and the sizes of crystals that can be practically incorporated into a contactor. Selectivation can provide the ability to lower the effective methane diffusion coefficient into the target range for a practical contactor while preserving and/or increasing the ratio of $D_{CO2}/D_{CH4}$. Considerations for the bounds on the absolute diffusivity of the light component can be identical for kinetically controlled separations of other gas mixtures. For the purpose of providing a testable measurement of performance, effective diffusion coefficients (for example, those of $CO_2$ and $CH_4$) can be substituted for transport diffusion coefficients measured for a pure gas in the Henry's law regime of the adsorption isotherm for the adsorbent. The loading of molecules in the unselectivated adsorbent (e.g., zeolite) can be low in the Henry's law regime, and, in this regime, the Fickian and Stephan-Maxwell diffusion coefficients can be nearly equal. The effective diffusivity of a porous crystalline material for a particular sorbate can be conveniently measured in terms of its diffusion time constant, $D/r^2$, wherein D is the Fickian diffusion coefficient ($m^2/s$) and the value "r" is the radius of the crystallites (m) characterizing the diffusion distance. In situations where the crystals are not of uniform size and geometry, "r" represents a mean radius representative of their corresponding distributions. One way to measure the time constant and diffusion coefficient can be from analysis of standard adsorption kinetics (i.e., gravimetric uptake) using methods described by J. Crank in "The Mathematics of Diffusion", 2nd Ed., Oxford University Press, Great Britain, 1975. Another way to measure the time constant and diffusion coefficient can be from analysis of zero length chromatography data using methods described by D. M. Ruthven in "Principles of Adsorption and Adsorption Processes", John Wiley, NY (1984) and by J. Karger and D. M. Ruthven in "Diffusion in Zeolites and Other Microporous Solids", John Wiley, NY (1992).

Another way to obtain the diffusion coefficients can be to measure the time constant for adsorption and desorption in a cyclic single component pressure swing adsorption unit. In such a unit the adsorbent is periodically pressurized and depressurized with a pure single component gas. Each component of interest (for example $CO_2$, $CH_4$, $N_2$, and He) can be studied separately. Measurements with He are often used to simplify interpretation of the data collected. Pressurization can be done by throwing a valve to connect a pressurized tank to the cell holding the adsorbent and then closing the valve. Depressurization can be done by throwing another valve to connect a low pressure tank to the cell holding the adsorbent and then closing the valve. The moles adsorbed and desorbed from the sample can be determined from pressure, volume, and temperature measurements of the tanks and the cell. A continuous cyclic process can be created by resetting the tank pressures after the pressurization and depressurization steps. The time constant for uptake can be readily converted into an effective diffusion coefficient using a linear driving force (LDF) approximation. For example, if the adsorbent is treated as an isotropic medium with a uniform diameter, then the LDF mass transfer coefficient ($s^{-1}$) can be: $\tau(LDF) \approx 16.2 * D_{effective} * (d_{crystal}/2)^2$. This approximation is commonly used to model swing adsorption processes.

Additionally or alternately, the 8-ring zeolites described above can be selectivated to increase their kinetic selectivity for nitrogen separation from methane, or more generally for separation of nitrogen from $C_1$-$C_4$ or $C_1$-$C_3$ hydrocarbons in a gas stream. The improved kinetic selectivity of the suitable 8-ring materials can allow $N_2$ to be rapidly transmitted into zeolite crystals while hindering the transport of methane (or other small hydrocarbons), so that it is possible to selectively separate $N_2$ from a mixture of $N_2$ and methane. For the removal of $N_2$, the ratio of effective single component diffusion coefficients of $N_2$ and methane (i.e., $D_{N2}/D_{CH4}$) in the selectivated adsorbent can be greater than 5, e.g., greater than about 20, greater than about 50, or greater than about 100.

Depending on the embodiment, considerations for the absolute value of the methane diffusivity can be similar to those discussed previously.

Selectivation of Adsorbent Materials

Different preparations of adsorbent material can have significantly different diffusion coefficients. Even with the same preparation technique diffusion coefficients can in some instances vary from batch to batch. This has been especially true for zeolites. Selectivation can provide a method for mitigating variations in the diffusivity of the light component that could deleteriously affect recovery of said light component.

Selectivation processes can be applied to a wide variety of adsorbent materials. The process of selectivation can be illustrated with zeolite adsorbents, but it should be understood that microporous materials with other types of framework atoms and/or other ring structures can also be selectivated. Zeolites are crystalline materials that are usually grown in a hydrothermal synthesis process that often uses a structure directing agent. After recovering the zeolitic crystalline product from the hydrothermal synthesis mixture, it is often calcined to remove template and other material that can block access to the pore structure inside the crystalline particles. The process of selectivation can be applied after the pore structure of the adsorbent has been opened. In this specification, zeolite crystals that have been calcined to remove the structure directing agent are referred to as "as-synthesized" materials.

Two different classes of techniques have been developed to selectivate m adsorbents. The first involves longer term exposures to lower fugacities of the selectivating molecules, while the second involves exposure at higher fugacities and temperatures for shorter periods of time. Without being bound by any particular theory, it is believed that selectivation of an adsorbent can be achieved by having the molecules enter the adsorbent and occupy locations within the pores of the adsorbent. Selectivating molecules can be concentrated in an absorption front that passes inward from the exterior surface of the adsorbent. The concentration of selectivating molecules can decrease dramatically at distances beyond which the front has penetrated. The selectivating molecules can act as barrier compounds altering the ability of potential adsorbates to enter the adsorbent and move within the adsorbent. This can result in an increase in kinetic selectivity for the adsorbent. For example, the selectivation by the barrier compounds can cause the kinetic selectivity for an 8-ring zeolite to increase for gas separation of $CO_2$ and/or $N_2$ from $CH_4$ or another hydrocarbon. Optionally, the barrier compounds can also form a passivation layer at the surface of the adsorbent that improves the kinetic selectivity of the adsorbent.

Preferably, the barrier compounds can slowly diffuse (diffusion coefficients less than $10^{-15}$ $m^2/s$) through the pore structure of the adsorbent under operating conditions. Very slow diffusing molecules (diffusion rates less than $10^{-19}$ $m^2/s$) can be concentrated in pores away from the center of the adsorbent (i.e., pores near the surface of the adsorbent). In the extreme limit of ultra-slow diffusion (less than $10^{-23}$ $m^2/s$), the molecules can be located in a distinct layer that extends inward from the surface of the adsorbent. Having the barrier formed in/among pores near/on the surface of the adsorbent can help to improve the kinetic selectivity in a swing adsorption process by immediately blocking or retarding the transport and hence decreasing the adsorption kinetics of the species to be kinetically excluded from the adsorbent. This can help increase recovery by not picking-up molecular species to be recovered as a product during the adsorption step. For 8-ring zeolites, examples of molecules in the range from slowly diffusing to very slowly diffusing molecules can include linear alkanes with more than 4 carbons in the chain and primary linear alcohols with more than 3 carbons. For 8-ring zeolites, examples of molecules that can include very slowly diffusing to ultra-slowly diffusing can include mono-branched alkanes, di-branched alkanes, 2-octanol, secondary alcohols, multiple-branched alkanes, branched primary alcohols, and combinations thereof. Ultra-slowly diffusing molecules can include tertiary branched paraffins, such as 2,2,4 trimethyl pentane. Slowly diffusing and ultra-slow diffusing molecules can allow the formation of a relatively stable selectivation layer that does not require frequent regeneration or replenishment.

To form an effective barrier that blocks or retards transport, the maximum loading of the blocking compound in/among the pores near the surface of the adsorbent should be at least 10% of its saturation loading ($q_s$, typically expressed in mmol/gram). In other embodiments, the maximum loading of the blocking compound in/among the pores near the surface of the adsorbent can be at least 40% of its saturation loading, e.g., at least 75% of its saturation loading. In other embodiments, the loading can be limited relative to the saturation loading in order to provide at least some open channel. In such embodiments, the loading can be 20% of the saturation loading or less, e.g., 15% or less. The region near the surface can be taken to mean a distance from the surface within 5% of the adsorbent diameter or average particle size. This maximum loading can be estimated from the fugacity of the blocking compound in the vapor to which the adsorbent is exposed. The estimation uses a Langmuir isotherm to approximate the equilibrium uptake of the blocking compound. The mathematical form of a Langmuir isotherm can be:

$$q/q_s = b*f*(1+b*f)$$

where q is the loading (mmol/gram) of the blocking compound, $q_s$ is the saturation loading (mmol/gram) of the blocking compound, f is the fugacity (bar) of the blocking compound, and b is the Langmuir coefficient (1/bar). This condition can be achieved by exposure to vapor pressures of the barrier compounds with molecular weight of at least about 50 g/mol, e.g., at least about 60 g/mol, at partial pressures greater than about 10% of the saturated vapor pressure. Higher maximum loadings can be achieved by exposure to higher partial pressures of the barrier compounds, such as at least about 25% of the saturated vapor pressure, at least about 50%, or at least about 90%. For exposure at very high partial pressures of the barrier compounds, a liquid phase can form, and suitably high loadings of the barrier compounds can be achieved. Examples of suitable barrier compounds can include, but are not limited to, alkanes (e.g., paraffins), other hydrocarbons, alcohols, other oxygenates, amines, and sulfur bearing compounds. Paraffinic species can include linear paraffins, mono-branched paraffins, multiply-branched paraffins, tertiary branched paraffins, and combinations thereof. Alcohols can include primary and secondary alcohols. Oxygenates can include glycols, such as ethylene glycol and triethylene glycol. Examples of amines can include methyldiethylamine and dimethylethylamine. One example of a sulfur bearing compound is dimethyl disulfide. Selectivating with a blocking compound having a "b" value of greater than 10/bar at the characteristic temperature of the swing adsorption process can help to mitigate loss of the blocking compound after it has been loaded into the adsorbent. Use of blocking compounds with higher b values (such as at least 100/bar or at least 1,000/bar) at the characteristic temperature of the swing adsorption process temperature) can further mitigate loss of the blocking compound during operation of a swing adsorption or membrane separation process.

Molecular size can affect both the adsorption strength (b value) as well as the diffusivity of the blocking compound. Molecular sizes can be characterized by a maximum and minimum dimension of the blocking molecule. For example, for a linear paraffin, the maximum dimension can be set by the stretched out chain length and the minimum dimension can be set by the chain diameter. Increasing maximum dimension of a blocking molecule can tend to increase the b value and lower the diffusivity. When the maximum dimension of the blocking molecule becomes too big, it cannot selectively block transport of one molecular species as effectively while allowing another species to rapidly transport. For 8-member ring zeolite adsorbents, the maximum dimension of the blocking compound can be less than about 25 Angstroms and greater than about 4 Angstroms. Enhanced performance can be achieved for 8-member ring zeolite adsorbents when the maximum dimension is less than about 15 angstroms and greater than about 6 angstroms. Molecules with smaller maximum dimensions, such as $CO_2$, $H_2S$, methane, ethane, and $H_2O$, do not appear to improve the kinetic selectivity of adsorbents. The minimum dimension of the blocking molecule can determine its ability to diffuse into a zeolite. As the minimum dimension of the blocking molecule increases, the diffusion coefficient can tend to decrease. When the minimum dimension becomes too large, the diffusion coefficient can fall to the point that a compound cannot pass into the interior of the zeolite in a practical amount of time. The size of a molecule that can pass into the pore structure of a zeolite may be larger than what might be inferred from the database of zeolite structures published by the International Zeolite Association (IZA); http://izasc.ethz.ch/fmi/xsl/IZA-SC/ft.xsl. For each framework type, the database gives the dimension of a hard sphere that can diffuse along each direction in a rigid zeolite framework. Because of the flexibility of the zeolite framework, molecules with minimum dimensions significantly larger than those inferred from the IZA database can penetrate into the zeolite pore structure. To be able to load blocking molecules into the zeolite the minimum molecular dimension can be less than 2.0 Angstroms greater than the IZA's dimension of the largest hard sphere that can diffuse along any direction in a rigid zeolite framework. To be able to have a more facile loading of blocking molecules into the zeolite their minimum molecular dimension can be less than 1.5 Angstroms greater than the IZA's dimension of the largest hard sphere that can diffuse along any direction in a rigid zeolite framework. To have a diffusion coefficient small enough to trap the blocking molecules in the zeolite, the minimum molecular dimension of blocking molecules can be greater than about 0.4 Angstroms greater than the IZA's dimension of the largest hard sphere that can diffuse along any direction in a rigid zeolite framework. Trapping of blocking molecules can be enhanced if their minimum molecular dimension is greater than about 0.6 Angstroms greater than the IZA's dimension of the largest hard sphere that can diffuse along any direction in a rigid zeolite framework. Additionally or alternately, the dimensional differences can be expressed as percentages of the dimension of the largest hard sphere from the IZA database. In such embodiments, the minimum molecular dimension can be less than about 60% greater than the IZA's dimension of the largest hard sphere that can diffuse along any direction in a rigid zeolite framework, e.g., less than about 55% greater, less than about 50% greater, less than about 45% greater, or less than about 40% greater. Additionally or alternately in such embodiments, the minimum molecular dimension can be at least about 10% greater than the IZA's dimension of the largest hard sphere that can diffuse along any direction in a rigid zeolite framework, e.g., at least about 15% greater, at least about 20% greater, or at least about 25% greater.

For example, the IZA database lists the size of the largest hard sphere that can diffuse along any direction in a rigid DDR zeolite framework as 3.65 Angstroms. Thus, the preferred minimum dimension of a suitable blocking molecule for DDR can be between about 4.05 and 5.65 Angstroms. To facilitate loading of the blocking molecules into DDR, it can be preferred that the minimum dimension of the blocking molecule be less than about 5.15 Angstroms. To enhance the trapping (i.e., long term stability) of the blocking compound in DDR, it can preferred that the minimum dimension of the blocking molecule be greater than 4.25 Angstroms. For selectivation of a DDR type zeolite, examples of molecules that fall in these size ranges can include, but are not limited to, n-hexane, 2-methylpentane, 2-methylhexane, hexanol, 2-hexanol, 2-heptanol, 2-octanol, 2-methyl-1pentanol, 2-methyl-1-hexanol. For a DDR type zeolite, examples of molecules that fall outside this size range include toluene, cyclohexyl amine, butylamine, and n-methylpyrrolidone. Experiments have shown that long term exposures at temperatures near 100° C. to saturated vapors of these molecules that fall outside of this size range do not appear to significantly improve the kinetic selectivity.

Some molecules used to selectivate can react with defects in zeolite framework structures (such as hydroxyls), chemically bonding them inside the framework. This can enhance the stability of the selectivation. For instance, primary and secondary alcohols can diffuse into the zeolite structure and subsequently react with hydroxyls and other defects in the structures. This reaction can trap the molecules so as to be able to resist desorption upon heating to temperatures of ~350° C. or higher in an inert atmosphere (e.g., $N_2$).

A variety of methods can be used for applying a barrier compound to an adsorbent. One option can be to expose an adsorbent to the barrier compound prior to incorporating the adsorbent into a bed of a swing adsorption unit. In that situation, adsorbent particles can be treated before formulating them into a bed. Formulation techniques can include forming a pellet with the selectivated adsorbent and a binder, casting the selectivated adsorbent and a binder into a film, wash coating the selectivated adsorbent and optionally a binder onto a support such as a monolith. In one embodiment the adsorbent can be selectivated for a period of about 1 hour to about 150 hours, at pressures ranging from about 100 psig (about 690 kPag) to about 2000 psig (about 13.8 MPag), at temperatures ranging from about 155° C. to about 350° C., by direct exposure to a high concentration (>90 mol %) of the molecules chosen to alter the kinetic selectivity of the adsorbent. Lower temperatures can slow diffusion of the molecules chosen for selectivation into the adsorbent, while temperatures that are too high can lead to thermal degradation of the barrier compound. Treatment times can be reduced without thermally degrading the selectivating molecules, e.g., by using temperatures from about 250° C. to about 310° C. To increase the degree of loading, it can be desirable to use as high a fugacity as possible for the treatment. If the selectivating molecules can be condensed into a liquid phase, then the fugacity usually does not rise very rapidly with increasing pressure, and the treatment pressure can be reduced to a point just above (>1 psi above) the pressure at which the condensation occurs. If there is no liquid phase transition, then it can be desirable to use a pressure such that the fugacity (f) is such that the product (b*f) is greater than 10 at the temperature of the selectivation. This condition can routinely be met when the selectivation is done at pressures greater than about 500 psig (about 3.5 MPag). Often, it can be desirable to use a neat (pure) compound for selectivation. When this is done, it can be preferred that the purity of the compound is greater than about 95 mol %, often greater than about 99 mol %. It can be preferable for the impurities present not to interfere with the loading and selectivating properties of the compound. When a mixture of compounds is used for selectivation, it can be preferred that more than about 95 mol % of the molecules in the mixture are those targeted for loading into the adsorbent, and it can be desirable for the purity of the molecules in the mixture to be greater than about 99 mol %. When the selectivation occurs at elevated pressure and temperature, the adsorbent can be loaded with a blocking compound inside an autoclave. When an autoclave (or batch treater) is used, it can take time for the autoclave to heat and cool. To provide process latitude without sacrificing throughput, it can be desirable to have the treatment time be in a range from about 2 hours to about 20 hours. If a continuous high pressure/high temperature treater is used (for example, a high pressure fluid bed treater), shorter average residence times can be achieved. After the barrier compound is loaded in the adsorbent, the adsorbent can be cooled for further processing that can ultimately incorporate it into a bed in a contactor. Because the barrier compound is believed to be at least partially within the pore structure of the adsorbent, the barrier compounds can be maintained within/among the adsorbent during multiple swing adsorption cycles. Improvement in kinetic selectivity and reduction in the absolute diffusivity of the light component can vary, depending on the exact choice of the selectivating molecule as well as the combination of time, temperature, and pressure conditions chosen in the selectivation process. It can thus be desirable to optimize the choice of conditions by measurement of the diffusivity of the light component. It can be desirable to accurately measure this quantity, because the recovery of the light component can depend on the absolute value of its effective diffusivity. Because the heavy component tends to diffuse rapidly, measurement of its diffusivity only has to be accurate enough to establish sufficient kinetic selectivity for the swing adsorption process.

Alternatively, before incorporating an adsorbent structure into a bed, the adsorbent can be selectivated by exposure to the barrier compound for times longer than 150 hours. Because of the lower throughput in manufacturing, this is usually a less desirable process to make a selectivated adsorbent. With longer exposure times, selectivation may be done at lower temperatures and/or lower pressures.

Another option can be to expose the adsorbent to the barrier compound after it has been incorporated into a bed or a component to be assembled into a bed to be used in the contactor within the a swing adsorption unit. When the bed is formed with pellets containing the adsorbent, the pellets can be selectivated after they are formed using the procedure that was previously described to selectivate adsorbent particles. When the beds are designed for use in a parallel channel contactor, beds can be selectivated individually using the procedures described to selectivate adsorbent particles. For example, a bed in a parallel channel contactor may be a monolith that has been wash coated with the adsorbent. In such a situation, the monolith can be selectivated in an autoclave using the procedure described to selectivate adsorbent particles. In all such situations, the bed can be selectivated before being incorporated into a swing adsorption unit.

To selectivate beds containing DDR adsorbents, examples of suitable barrier compounds that can be deposited using the procedures described can include, but are not limited to, n-hexane, 2-methylpentane, 2-methylhexane, hexanol, 2-hexanol, 2-heptanol, 2-octanol, 2-methyl-1-pentanol, 2-methyl-1-hexanol, and combinations thereof.

Another option can be to expose the adsorbent to the barrier compound after beds have been assembled to form a contactor. In this case, it can be desirable to to be able to heat the contactor to temperatures greater than 100° C., e.g., greater than 150° C., and/or to expose the contactor to barrier compound(s) with a molecular weight of at least about 50 g/mol, such as at least about 60 g/mol, at higher partial pressures, such as a partial pressure corresponding to at least about 25%, e.g., at least about 50% or at least about 90%, of thee saturated vapor pressure of the barrier compound(s). If the temperature is high enough so that no liquid phase of the barrier compound(s) is present, then it can be desirable to conduct the exposure at pressures greater than about 100 psig (about 690 kPag) with at least about 10 mol % (e.g., at least 50 mol %) of the barrier compound(s) in the stream. Exposure times can range from hours to weeks.

Another option can be to perform the selectivation after the contactors have been installed within a swing adsorption unit. In this case, the selectivation can be performed when the contactor is within a functional swing adsorption unit, with a barrier compound with molecular weight of at least about 50 g/mol, such as at least about 60 g/mol, being incorporated into the feed gas at partial pressures greater than about 10%, e.g., at least about 25%, at least about 50%, or at least about 90%, of the saturated vapor pressure. Selecting suitable barrier compound concentrations can depend on the choice of barrier compound, cycle length, temperature at which the separation process is conducted, and the length of treatment time, inter alia. Treatment times can be from days to months. Methods by which barrier compounds can be incorporated into the feed gas stream can include direct injection and/or use of vaporizers such as bubblers. It can be preferred to add barrier compounds to the feed stream, even though, in some instances, barrier compounds may already be present. As the adsorbent selectivates due to exposure to the barrier compounds, the performance of the swing adsorption unit can advantageously change. It can be desirable to control and plan for the rate of performance change. Once the performance has reached a desired target, the concentration of barrier compound in the feed stream can be reduced. In some instances a small maintenance level of the barrier compound may be added to the feed to improve the long-term stability of the selectivation. The goal of the selected conditions can be to allow the barrier compound to enter the pore network to improve the kinetic selectivity of the adsorbent, thus lowering the diffusivity of the light component. It can also desirable for the selectivation to be maintained between cycles in a manner that does not cause a large excess of the barrier compound to build up on the adsorbent surface.

Another option for selectivation can be to include a barrier compound in a separate gas stream passing through a contactor after it is installed within a working swing adsorption unit. This stream can be different from the feed stream, in which case the unit does not have to be operated in a manner to produce a separation of the stream. As such, the valve sequencing in the unit need not be the same as that used for the cyclic swing adsorption process. Streams containing the barrier compound can be recycled and sent back through the unit or can be used on a once through basis. When the stream is recycled, the barrier compound can be replenished either by direct injection and use of vaporizers such as bubblers. Streams containing the barrier compound can be sent through the unit at temperatures greater than those used in the swing adsorption process. Similarly, the unit can be heated while the selectivating stream is being sent through the unit. In either case, it can be desirable to perform the exposure to selectivating molecular species at temperatures greater than 100° C., e.g., greater than 150° C. Concentrations of the barrier compound can be higher than in the case in which it is incorporated into the feed of a unit performing a separation. In such a case, it can be preferred that the exposure be done with higher partial pressures of the barrier compounds, such as at least about 25%, e.g., at least about 50% or at least about 90%, of the saturated vapor pressure. If the temperature is high enough so that there is no liquid phase of the barrier compound present, then it can be desirable to conduct the exposure at pressures greater than about 100 psig (about 690 kPag) with at least 10 mol % (e.g., at least 50 mol %) of the barrier compound in the stream. Exposure times can be from hours to weeks.

Any two or more of the options can alternately be combined to provide for improved selectivity, as desired.

Other Embodiments

Additionally or alternatively, the present invention can include one or more of the following embodiments.

Embodiment 1

A method for performing a gas separation, comprising: contacting an adsorbent or membrane comprising an 8-member ring zeolite or an 8-member ring microporous material with a barrier compound under effective conditions to selectivate the adsorbent or membrane, wherein the barrier compound has a minimum dimension of about 4.05 Angstroms to about 5.65 Angstroms and a maximum dimension of about 25 Angstroms or less for an 8-member ring zeolite or an 8-member ring microporous material; contacting the selectivated adsorbent or membrane with an input gas stream containing a first component and a second component to form a first gas stream enriched in the first component relative to the input gas stream; and collecting a second gas stream enriched in the second component relative to the input gas stream.

Embodiment 2

The method of Embodiment 1, wherein the 8-member ring zeolite is a DDR type zeolite, Sigma-1, ZSM-58, or a combination thereof.

Embodiment 3

The method of any of the above embodiments, wherein the barrier compound is a glycol, an amine, an alcohol, an alkane, a sulfur bearing compound, or a combination thereof, the barrier compound having a molecular weight of at least 50 g/mol.

Embodiment 4

The method of any of the above embodiments, wherein the barrier compound is ethylene glycol, triethylene glycol, methyl diethyl amine, dimethyl ethyl amine, dimethyl disilane, n-hexane, 2-octanol, or a combination thereof.

Embodiment 5

The method of claim 1, wherein the first component comprises or is $CH_4$.

Embodiment 6

The method of any of the above embodiments, wherein the second component comprises or is $CO_2$, $N_2$, or a combination thereof.

Embodiment 7

The method of claim 1, wherein the effective conditions for contacting the adsorbent or membrane with a barrier compound comprise a temperature from about 50° C. to about 350° C. and a total pressure of about 100 psig (about 690 kPag) to about 2000 psig (about 13.8 MPag), wherein the blocking compound is present either as a liquid or as a gas with a partial pressure of the blocking compound that is at least about 10% of the saturation vapor pressure.

Embodiment 8

The method of Embodiment 7, wherein the effective conditions for contacting the adsorbent or membrane with a barrier compound comprise a temperature of at least about 150° C., such as at least about 250° C.

Embodiment 9

The method of any of the above embodiments, wherein contacting the selectivated adsorbent with an input gas stream comprises adsorbing, by the selectivated adsorbent, at least a portion of the second component during the contacting, the method further comprising desorbing at least a portion of the adsorbed second component to form a desorbed second component portion, wherein the second gas stream comprises at least a portion of the desorbed second component portion.

Embodiment 10

The method of any of the above embodiments, further comprising desorbing at least a portion of the barrier compound during contacting the selectivated adsorbent or membrane with the input gas stream.

Embodiment 11

The method of any of the above embodiments, wherein the adsorbent is part of a swing adsorber unit, the swing adsorber unit being a pressure swing adsorber unit or a temperature swing adsorber unit.

Embodiment 12

The method of embodiment 11, wherein the swing adsorber unit is a rapid cycle pressure swing adsorber unit or a rapid cycle temperature swing adsorber unit.

Embodiment 13

The method of embodiment 11 or 12, further comprising repeating said contacting, desorbing, and collecting for a plurality of cycles.

Embodiment 14

The method of any of embodiments 1-8 or 10, wherein the first gas stream is a retentate stream and the second gas stream is a permeate stream.

Embodiment 15

The method of any of the above embodiments, wherein the amount of barrier compound adsorbed by the microporous material is about 20% or less of the saturation loading ($q_s$).

Embodiment 16

A method for performing a gas separation in a swing adsorber unit, comprising: contacting an adsorbent comprising a microporous material in a swing adsorber unit with a barrier compound under effective conditions to selectivate the adsorbent, the microporous material having pores characterized by a first dimension of a largest hard sphere that can diffuse along any direction in the pores and the barrier compound having a second dimension representing a minimum dimension of the compound, wherein the second dimension is between 10% greater than and 60% greater than the first dimension; contacting the selectivated adsorbent with an input gas stream containing a first component and a second component to form an output gas stream enriched in the first component relative to the input gas stream, the selectivated adsorbent adsorbing at least a portion of the second component during the contacting; desorbing at least a portion of the adsorbed second component to form a desorbed second component portion; and collecting a gas stream comprising at least a portion of the desorbed second component portion, the gas stream being enriched in the second component relative to the input gas stream, and optionally including the subject matter of any one or more of embodiments 3-15.

EXAMPLES

Example 1

Selectivation of DDR Crystals by Longer Term Exposure to Vapors of Barrier Compounds at Temperatures Below 150° C.

Selectivation of an adsorbent material can inhibit adsorption of a lighter component, such as $CH_4$, to a greater degree than a heavier component, such as $CO_2$ and/or $N_2$. Reduction of the value of the diffusion coefficient of the lighter component can play a significant role in improving recovery in membrane and swing adsorption processes. Thus, even though uptake of both lighter and heavier components may be reduced, it can be especially advantageous for the relative uptake rate of $CH_4$ (or another lighter component) to be reduced more than the heavier component.

The difference between $CH_4$ adsorption and $CO_2$ and/or $N_2$ adsorption on 8-member ring zeolite adsorbents can be seen in the order of magnitude (or greater) difference in the diffusion rate of the various components. It has been observed that different preparations of the 8-member ring zeolite DDR can have significantly different diffusion coefficients for $CH_4$, while maintaining a large ratio between diffusion coefficients for $CO_2$ and $CH_4$. This Example discusses transport and selectivation that are characteristic for three different batches of DDR crystals with high Si/Al ratios (>~100) that were found to have similar transport diffusion coefficients. Each crystal batch appeared to have a relatively uniform particle size. Characteristic dimension of the batch with the smallest sized crystals was ~2 microns, and the characteristic dimension of the batch with the largest size crystals was ~30 microns. The majority of the selectivation results presented come from a batch with a ~16 micron characteristic crystallite (particle) size. Selectivation characteristics discussed herein are believed to also apply to other preparations of DDR materials with different $CH_4$ diffusion coefficients in the as-synthesized crystals. The details of this Example are also believed to be applicable to the selectivation of other zeolites.

In this example, for DDR type 8-member ring zeolites, the transport diffusion coefficients for $CH_4$ at temperatures between about 50° C. and about 100° C. were found to range from about $1 \times 10^{-8}$ cm$^2$/s to less than $1 \times 10^{-9}$ cm$^2$/s. By contrast, in this same temperature range, the transport diffusion coefficients for $CO_2$ were found to range from about $1 \times 10^{-6}$ cm$^2$/s to about $1 \times 10^{-7}$ cm$^2$/s. The transport diffusion coefficient for $N_2$ was similar in order of magnitude to the transport diffusion coefficient for $CO_2$, but had less temperature variance. As a result, diffusion of $CO_2$ and/or $N_2$ in an 8-ring zeolite adsorbent appeared to occur on a rapid time scale relative to the much slower diffusion of $CH_4$. Due to the faster diffusion rates, the adsorption of $CO_2$ and/or $N_2$ can be influenced to a greater degree by equilibrium diffusion properties, while adsorption of $CH_4$ can be influenced to a greater degree by kinetic diffusion properties. Thus, a method inhibiting kinetic diffusion can likely have a greater impact on $CH_4$ adsorption than $CO_2$ and/or $N_2$ adsorption.

One technique for investigating the adsorption properties of an adsorbent is zero length chromatography. Zero length chromatography (ZLC) determines diffusion coefficients from measurements of rates at which adsorbed molecules are purged from samples after rapidly switching from adsorption to desorption conditions. Analysis of zero length chromatography data methods is described, e.g., by D. M. Ruthven in "Principles of Adsorption and Adsorption Processes", John Wiley, NY (1984) and by J. Karger and D. M. Ruthven in "Diffusion in Zeolites and Other Microporous Solids", John Wiley, NY (1992). An example of pure component zero length chromatography data on uniform sized DDR crystals is shown in FIG. 1. The ZLC apparatus used in this experiment was modified from that traditionally used in the literature to accommodate and operate with a larger amount of sample than the literature would indicate.

Data shown in FIG. 1 are for ethane diffusion out of DDR crystals at ~50° C. into a He stream as the flow through the ZLC cell is varied. The DDR crystals had an average size of about 16 μm. The flow through the ZLC was varied from ~5.2 mL/min to ~26 mL/min, as shown in the figure. In FIG. 1, the vertical axis shows a log scale of the concentration of ethane diffusing out of the DDR crystals relative to the amount of ethane diffusion at time 0. Thus, FIG. 1 shows the change in the amount of diffusion out of the crystals as a function of time. For each curve in FIG. 1, both a measured value and fits of the values to a model are shown.

As shown in FIG. 1, models using a single diffusion process throughout the crystal appear to match ZLC data sets taken for $CH_4$, $CO_2$, and $C_2H_6$ diffusion in DDR. For a known uniform crystal size, the model fits involved two parameters. One parameter was the diffusion coefficient while a second parameter was Henry's constant for molecular adsorption. In the fits to the model, the Henry's constant matched one determined experimentally by independent equilibrium adsorption measurements. The value fits to the data also matched the Henry's constant generated from theoretical predictions. The model fits to $CO_2$ and $CH_4$ data indicated that, for DDR crystals, mass transfer was controlled primarily by diffusion through the volume of the crystal.

Figure 2:
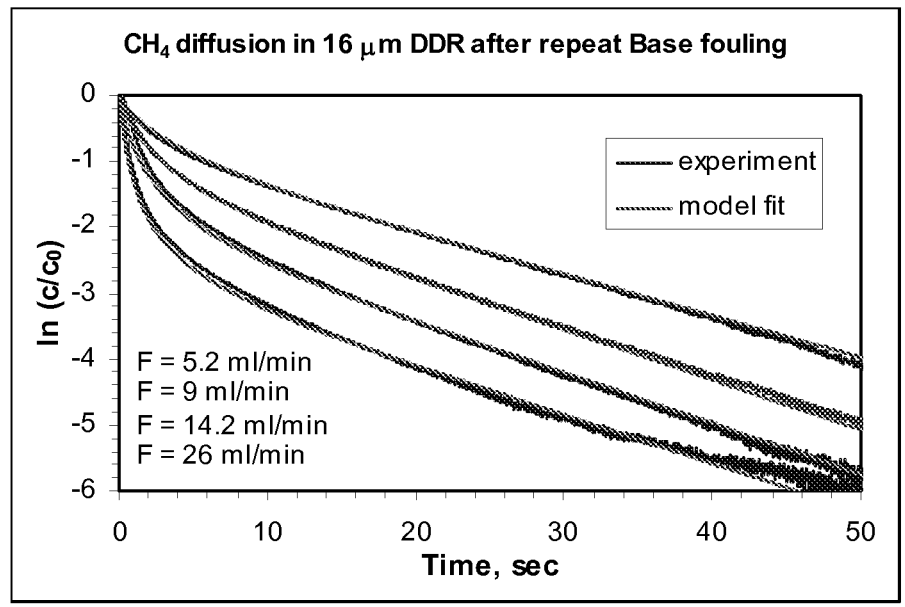

ZLC studies can also be used to investigate diffusion out of crystals that have been exposed to one or more barrier compounds and/or foulants. As an initial test, DDR crystals were exposed to a base gas mixture containing $CO_2$, $H_2S$, $CH_4$, and optionally small amounts of $C_2$-$C_2$ components for a ~1 month exposure period. The DDR crystals were exposed to the base gas mixture at a pressure of about 850 psig (about 5.9 MPag) and a temperature of ~100° C. FIG. 2 shows a ZLC data set for methane diffusion out of DDR crystals after exposure to base fouling. The model fits in FIG. 2 used parameters similar to the parameters for fresh crystals. As shown in FIG. 2, exposure to the base gas resulted in little or no change of measured methane diffusion relative to a single diffusion process model.

Figure 3:
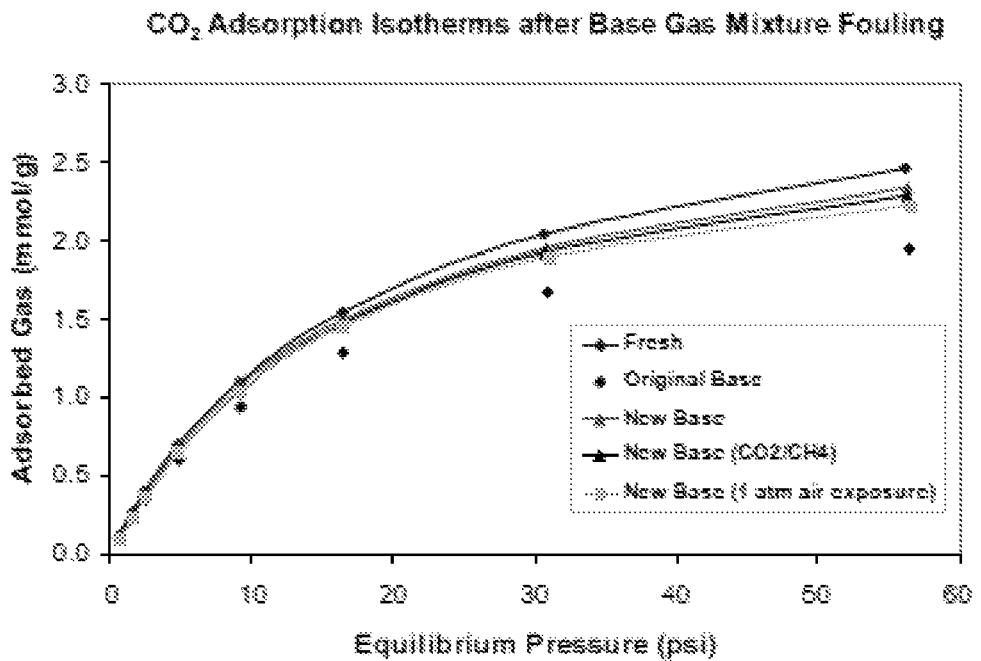
FIG. 3 shows $CO_2$ adsorption isotherms under various conditions.

Exposure to base gas also appeared to have minimal or no impact on $CO_2$ adsorption. FIG. 3 shows an example of $CO_2$ adsorption isotherms for DDR crystals in a fresh state and after exposure to several types of base gas. Due to the faster diffusion rate of $CO_2$ in DDR, an adsorption isotherm provided a clearer indication of differences in adsorption activity. As shown in FIG. 3, the adsorption isotherms for $CO_2$ on DDR crystals exposed to various types of base gas were comparable to the adsorption isotherm for fresh crystals.

The data in FIGS. 2 and 3 indicated that exposure to $CO_2$, $H_2S$, and $H_2O$ did not appear to have a significant impact on the adsorption characteristics of the DDR crystals. This finding was in contrast to barrier compounds according to the invention, which appeared to modify the transport characteristics of such crystals.

Additional ZLC studies of $CH_4$ transport in DDR crystals were performed where an additional single barrier compound and/or foulant was included in the base gas mixture. The exposure conditions were otherwise similar to the base gas exposure conditions mentioned above. $CO_2$ adsorption isotherms were also generated for DDR crystals exposed to base gases including the various barrier compounds and/or foulants at or near their saturated vapor pressure in the base gas mixture.

In addition to the above ZLC studies and $CO_2$ adsorption isotherms, alteration of both $CH_4$ and $CO_2$ adsorption was shown for several barrier compounds. The barrier compounds that impacted the adsorption characteristics included ethylene glycol, triethylene glycol, dimethyl disulfide (DMDS), hexane, methyl diethyl amine (MDEA), and dimethyl ethyl amine (DMEA). By contrast, additional ZLC studies and $CO_2$ adsorption isotherms showed little or no impact on the adsorption properties of DDR for several foulants with a characteristic (minimum) dimension greater than the barrier compounds. For example, DDR crystals exposed to toluene, N-methyl pyrrolidone, cyclohexyl amine, and butylamine did not show any significant alteration in $CO_2$ adsorption.

Alteration of the mass transfer kinetics was studied for samples selectivated by DMDS, MDEA, and DMEA. The selectivation was believed to be due in part to entry of barrier compounds into the pores of the adsorbent, resulting in a reduced likelihood of $CH_4$ diffusion into the crystals. For illustration, a clear example of the impact of a barrier compound on $CH_4$ transport was produced by selectivating a DDR zeolite adsorbent using MDEA. In this Example, DDR zeolite crystals were selectivated by exposing the DDR zeolite crystals for about one month at a temperature of ~100° C. to a base gas mixture that was initially in contact with a liquid pool of MDEA. The liquid was not in contact with the adsorbent and served to saturate the base gas mixture with MDEA. The amount of MDEA in the pool contained more than 50 times the number of molecules required to saturate the base gas mixture. The saturated MDEA vapor in this experiment had a the concentration of MDEA in the gas phase more than 5000 times greater than concentrations expected in field applications for swing adsorption units that a processing natural gas.

Figure 4:
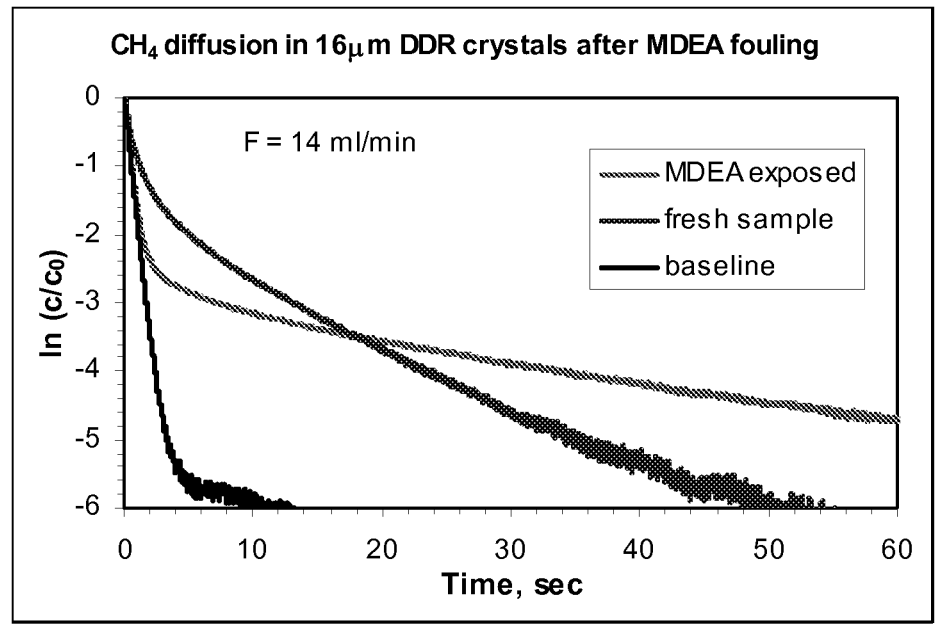
FIGS. 4 and 5 show zero length chromatography results for diffusion of gases under various conditions.

FIG. 4 shows ZLC studies for DDR crystals after various treatments. In FIG. 4, the "baseline" plot shows an example of the output from a ZLC measurement without inserting an adsorbent material to capture the methane. The fresh sample curve shows the measured diffusion of methane for DDR crystals prior to exposure to a selectivating agent. The MDEA exposed curve corresponds to DDR crystals selectivated by MDEA as described above. As shown in FIG. 4, the diffusion of methane out of the selectivated DDR crystals was initially lower than for the non-selectivated crystals. However, the diffusion out of the selectivated DDR crystals then stabilized to have a shallower slope than the non-selectivated crystals.

Figure 5:
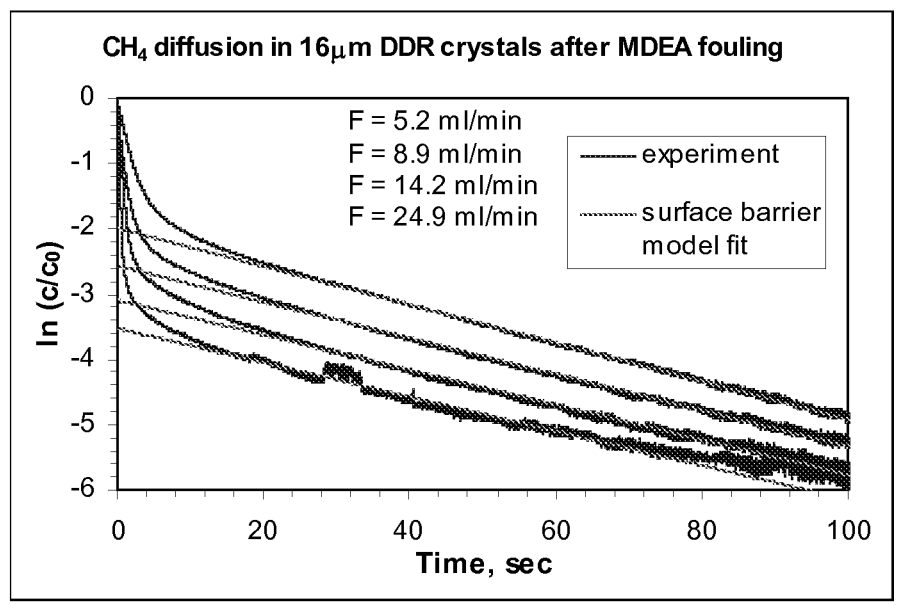

FIG. 5 shows additional ZLC studies at different flow rates of $CH_4$ for the MDEA selectivated crystals described above. In addition to showing the measured ZLC diffusion amounts, FIG. 5 also shows a fit of the shallow slope portion of the curve to a "surface barrier" model of diffusion. As shown in FIG. 5, the surface barrier model provided a reasonable fit for the long tail of the diffusion. This indicates that the MDEA exposure had an effect similar to formation of a surface barrier on the DDR crystals.

Figure 6:
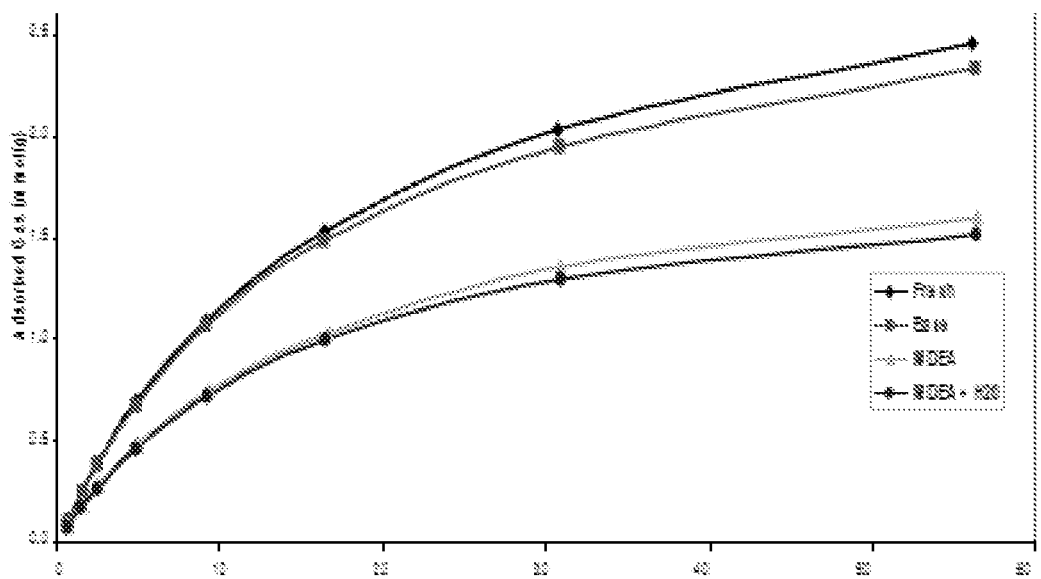
FIG. 6 shows $CO_2$ adsorption isotherms under various conditions.

In addition to modifying the diffusion characteristics for $CH_4$, the MDEA also appeared to modify the adsorption characteristics for $CO_2$. FIG. 6 shows adsorption isotherms for $CO_2$ for both non-selectivated and selectivated DDR crystals. As shown in FIG. 6, selectivation with MDEA in the presence or absence of water resulted in comparable levels of selectivation. The DDR crystals exposed to MDEA showed an approximately 30% reduction in the amount of adsorbed $CO_2$, as compared to non-selectivated crystals.

As a further study, the degree of selectivation of DDR crystals was investigated using a cyclic selectivation experiment. In the experiment, $N_2$ was bubbled through a barrier compound or foulant. The $N_2$ flow was then passed into a cell containing DDR crystals. This exposed the crystals to the barrier compound. Periodically, the $N_2$ flow was stopped and a gas containing $CO_2$, $N_2$, and $CH_4$ was introduced. The cycle period for the apparatus ranged from about 1-20 seconds. The working capacity or adsorption of the crystals over time was compared with the initial adsorption of the crystals prior to exposure to the barrier compound.

Figure 7:
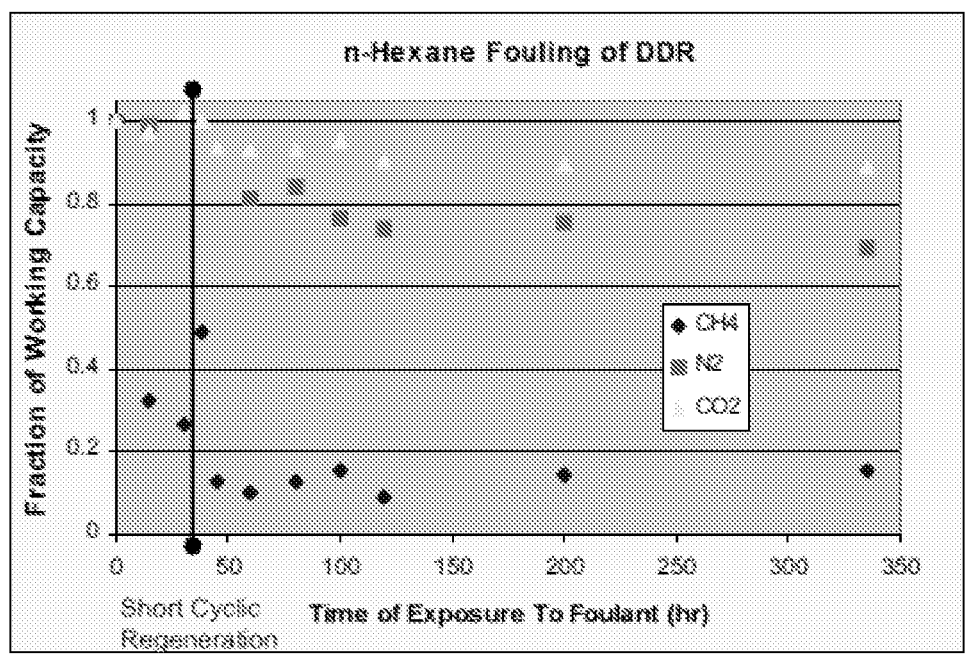
FIG. 7 shows the working capacity for a selectively passivated adsorbent over time relative to the equilibrium adsorption for a non-passivated adsorbent.

FIG. 7 shows the working capacity of the DDR crystals over time as the crystals were cyclically exposed to n-hexane. As shown in FIG. 7, the working capacity of the crystals for $N_2$ adsorption was at least about 70% of the initial working capacity throughout the procedure. For $CO_2$, the working capacity was at least about 80% of the working capacity throughout the procedure. This shows that the selectivation with hexane had a modest impact on $CO_2$ and $N_2$ adsorption during ~1-20 second long cycles. This was not surprising, as the equilibration time for $CO_2$ and $N_2$ is on the order of 0.1 seconds, so the $CO_2$ and $N_2$ adsorption amounts appeared to approach equilibrium levels during the cycles. By contrast, the amount of $CH_4$ adsorbed after starting the cyclic exposure to n-hexane was significantly lower. As shown in FIG. 7, the amount of adsorbed $CH_4$ for the selectivated DDR crystals was less than about 20% of the adsorbed amount for non-selectivated crystals. This demonstrates that the n-hexane was apparently selectivating the DDR crystals, so that $CH_4$ adsorption was inhibited to a greater degree than $CO_2$ or $N_2$ adsorption.

Similar cyclic fouling or selectivation studies were also performed using methanol, toluene, and water as the foulant or barrier compound. Cyclic fouling was conducted by exposing crystals to vapors of the foulant at an activity of 50% of saturation carried in a ~100° C. nitrogen stream whose pressure is swung from about 150 psig (about 1.0 MPag) to about 20 psig (about 130 kPag) every ~10-50 seconds. In these additional cyclic fouling studies, the working capacity for the DDR crystals did not appear to be impacted in a substantial way by the exposure for times greater than one week to methanol, toluene, or water.

Figure 8:
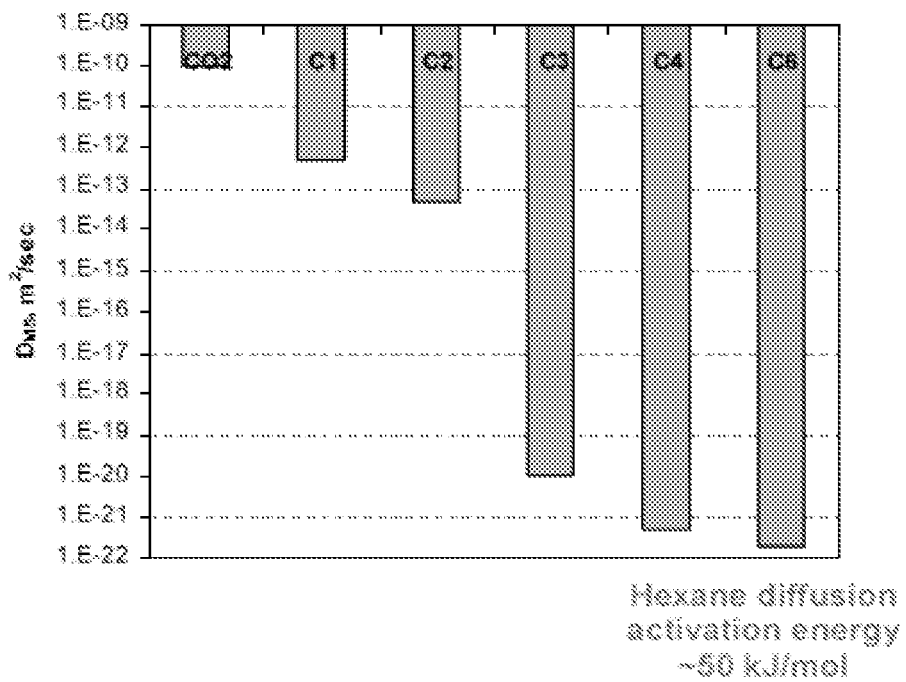
FIG. 8 shows diffusion coefficients at 30° C. for various alkanes.

The dramatic change in the $CH_4$ working capacity with only a modest change in the $CO_2$ and $N_2$ working capacities was believed to be due to at least partial entry of the hexane into the pore network of the adsorbent. The fact that hexane appeared to act as a barrier compound was deduced from measurements of diffusion coefficients at ~30° C. As shown in FIG. 8, the diffusion coefficients for alkanes containing 3 or more carbons were substantially smaller than the diffusion coefficients for methane or ethane.

In the cyclic fouling experiments performed at ~100° C. with n-hexane at ~50% of its saturated vapor pressure, it was believed that a strong adsorption front advanced a distance into the DDR crystals less than $(D*t)^{1/2}$. Based on the low value of the hexane diffusion coefficient, for a ~350-hour exposure, the maximum distance of penetration was about 150 Angstroms. Thus, it is believed that all of the transport changes were due to a thin layer of adsorbed hexane within the pore network of the DDR crystals near the surface. At the cycle time used to probe the fouling, the kinetic selectivity of DDR appeared to be enhanced by a factor of at least 5 for $CO_2/CH_4$ separations and by at least a factor of 4 for $N_2/CH_4$ separations. Because of a relatively long cycle time and the nature of the experimental protocol, selectivity enhancements achievable in a swing adsorption separation process are expected to be 5-10 times greater than this.

The impact of selectivation on kinetically controlled swing adsorption processes run with DDR has been modeled. Modeling results showed that, for bulk acid gas or $N_2$ removal, selectivation increased methane recovery by lowering the concentration of methane in the $CO_2$ or $N_2$ rich reject stream. Selectivation may also mitigate fouling of DDR by molecular species such as amines, DMDS, ethylene glycol, triethylene glycol, MeOH, carboxylic acids, and N-methylpyrrolidone. It is believed that selectivation of the crystal surface can inhibit or minimize the entry of foulants into the pores of the crystals.

Example 2

Selectivation of DDR Crystals by Shorter Term Exposure to High Concentrations of Mono- and Di-Branched Alkanes Above 250° C.

The size of mono- and di-branched alkanes was such that they would not have been expected to go into the DDR pores, based on the IZA published dimension of a hard sphere that can pass through the pores. Fundamental molecular simulations of flexibility of DDR frameworks, however, indicated that the pore structure occasionally flexes to a size where they might be able to enter. From the simulation of framework flexibility, it was still not clear if they would transport into the framework even at high temperatures.

To test whether mono- and di-branched alkanes could be diffused into DDR to fill enough pores to form a selectivation layer, a high temperature (~290° C.) selectivation procedure was chosen, because the diffusion of sterically hindered molecules into DDR was expected to be a highly activated process that would occur orders of magnitude faster at ~290° C. than at room temperature (~20-25° C.).

To test selectivation with mono- and di-branched alkanes, a different batch of DDR was used than that discussed in Example 1. This batch of DDR crystals had a Si/Al ratio >250 and was found to have significantly faster diffusion coefficients for $CH_4$ than those discussed in Example 1. Crystals in the batch were shaped like disks that were approximately uniform in size. The 2-dimensional connected pore structure allowing transport of $CO_2$ and $CH_4$ molecules was believed to be in the plane of the disk. A characteristic dimension for transport in the plane of the disk was about 7-9 microns.

To selectivate, quarter gram samples of the as-synthesized DDR crystals were loaded into a ~⅛-inch diameter pressure cell connected to a pressurized reservoir that was filled with 25 grams of a liquid phase mono- or di-branched alkane chosen for the selectivation. Purity of the liquids used in these experiments was greater than 99%. To selectivate, the cell holding the zeolite was filled with the liquid, pressurized to about 700 psig (about 4.8 MPag) and then heated to ~290° C. Once the samples had been held at temperature for the targeted time period, the pressure cell was rapidly cooled, and the selectivated DDR powder was recovered. Before conducting transport or TGA studies, excess molecules were removed by placing the powder in a nitrogen purged oven at ~70° C. for at least ~2 hours and then by placing the sample in a vacuum oven set in a range between ~60° C. and ~70° C. for ~12 hours.

To determine if a sufficient quantity of the selectivating molecules were trapped in the DDR, the weight percent of the selectivating molecule incorporated into the zeolite was assessed with TGA measurements. In the TGA, milligram quantities of selectivated powders were heated in a flowing nitrogen atmosphere to ~120° C. to remove species such as water and $CO_2$ that can adsorb in the sample. Samples were then held at ~120° C. for approximately an hour to make sure that the sample weight was stable and that nothing else continued to desorb. Temperature was then ramped at ~6° C./min to a temperature of ~600° C., held at that temperature for ~1 hour, and then rapidly cooled back to ~120° C. Differences in the weight recorded at ~120° C. before and after the temperature ramp were used to assess the weight loss that occurred when the sample was heated and held at ~600° C. This protocol was believed to eliminate errors from buoyancy effects in the TGA. The table below shows the weight lost in the TGA for different molecular selectivation of the DDR powder. This weight loss appeared to come from both desorption of the selectivating molecules at high temperature and from weight loss associated with changes in defects such as hydroxyls in the DDR crystalline lattice. To more accurately assess the uptake of selectivating molecules, a sample was treated with no selectivating molecules present. The weight loss of this sample was used to identify the weight loss due with changes in defects such as hydroxyls in the DDR crystalline lattice. Using this as a reference, Table 1 below shows the weight uptake (in wt %) of the selectivating molecules into the DDR. If the DDR lattice was completely filled with any of these molecules, then the weight change would have been greater than 5 wt %.

TABLE 1

| Selectivating Molecule | Temp (° C.) | Pressure (psig) | Exposure Time (hrs) | Weight Lost in TGA (wt %) | Loading of Selectivating Molecule (wt %) |
|---|---|---|---|---|---|
| Treatment with no selectivating molecule | 290 | 700 | 40 | 0.3 | 0.0 |
| 2-Methylpentane | 290 | 700 | 40 | 0.5 | 0.2 |
| 3-methylpentane | 290 | 700 | 22 | 0.7 | 0.4 |
| 2,5-Dimethylhexane | 290 | 700 | 20 | 0.6 | 0.4 |
| 3-methylhexane | 290 | 700 | 20 | 0.7 | 0.4 |
| 2-methylhexane | 290 | 700 | 20 | 0.5 | 0.2 |
| 2,4-Dimethylpentane | 290 | 700 | 20 | 0.5 | 0.2 |

TABLE 1-continued

| Selectivating Molecule | Temp (° C.) | Pressure (psig) | Exposure Time (hrs) | Weight Lost in TGA (wt %) | Loading of Selectivating Molecule (wt %) |
|---|---|---|---|---|---|
| 2,3-Dimethylpentane | 290 | 700 | 20 | 0.6 | 0.3 |

To demonstrate that these modest loading levels of the selectivating molecules can significantly reduce the methane diffusivity, ZLC experiments were conducted on three of the selectivated samples and on the as-synthesized DDR. The shape of the ZLC curve for the as-synthesized material did not conform to the expected theoretical shape and fits to different sections of the curve yielded $CH_4$ diffusivities at ~30° C. ranging from about $8 \times 10^{-13}$ $m^2/s$ to about $50 \times 10^{-13}$ $m^2/s$. Fits to these sections of the curve were interpreted as a description of how molecules at different loadings appear to transport out of the zeolite. A loading-averaged $CH_4$ diffusivity of these fits was taken to be ~$15 \times 10^{-13}$ $m^2/s$. Single component PSA studies of a film made from this zeolite supported a higher average diffusivity in the range of ~$30 \times 10^{-13}$ $m^2/s$ at the PSA testing condition of ~10 bar (~10.1 MPag) and ~22° C. For all three selectivated samples, the shape of the ZLC curve matched the expected theoretical form. The sample selectivated with 2-methyl pentane had a $CH_4$ diffusivity at ~30° C. of ~$2.2 \times 10^{-13}$ $m^2/s$. Repeat measurements of the DDR sample selectivated with 3-methyl pentane yielded $CH_4$ diffusivities at ~30° C. of ~$2.2 \times 10^{-13}$ $m^2/s$ and ~$2.5 \times 10^{-13}$ $m^2/s$. Repeat measurements of the DDR sample selectivated with 2,5 di-methyl hexane yielded $CH_4$ diffusivities at ~30° C. of about $1.6 \times 10^{-13}$ $m^2/s$ and about $1.9 \times 10^{-13}$ $m^2/s$.

Example 3

Selectivation of a DDR Films by Shorter Term Exposure to High Concentrations of a Mono Branched Alkanes at Temperatures Above 250° C.

Example 3 involves exposing an adsorbent to the barrier compound after the adsorbent has been incorporated into a bed or a component that can be assembled into a bed and used in the contactor within a swing adsorption unit.

This Example used a batch of DDR crystals different from the batches in Examples 1 and 2, in that this batch of DDR crystals had a broader particle size distribution. This batch of DDR crystals also had a characteristic dimension of ~13 μm and a $CH_4$ diffusivity measured by ZLC at ~30° C. of ~$12 \times 10^{-13}$ $m^2/s$.

Approximately 200 micron thick films were cast from a slurry of a colloidal silica binder and DDR crystals using a doctor blade to apply them to a flat polished steel plate that had been previously coated with a thin (<25 micron) zirconia layer to improve adhesion. Once applied, the plate was heated to ~150° C. to cure the coating. It was estimated that open pores occupied less than about 30 vol % of the cured film, and the mass of DDR was >15 times that of the binder. The steel plate was ~1.9 inches wide and ~5 inches long. In the blade process, the edges of the plate were masked so that the width of the film on the plate was ~1.6 inches. The uncoated edges of the plate were used to seal the plate into a cell that could be installed in a single complement pressure swing adsorption unit. Once the plate was sealed into the cell, the flow channel that was left on top of the film was approximately 250 microns thick.

Single component pressure swing adsorption experiments were first performed at room temperature (~20-25° C.) and ~50° C. to characterize the transport properties of the as synthesized film. Individual experiments were conducted at each temperature with $CO_2$, $CH_4$, $N_2$, and He. In each experiment, the adsorbent was cyclically pressurized to about 125 psig (about 863 kPag) and depressurized to about 25 psig (about 170 kPag). Measurements were taken after a cyclic steady state operation was achieved. Pressurization was done by opening a valve to connect a tank pressurized to ~150 psig (~1.0 MPag) and filled with a packing (mitigating temperature changes) to the cell holding the adsorbent at a pressure of ~25 psig (~170 kPag). After about 0.25 seconds, the valve was closed, at which time the tank pressure fell to about 125 psig (about 863 kPag), and the cell pressure rose to about 125 psig (about 863 kPag). Accurate measurements of the real rise and fall of the tank and cell pressures and temperatures were used in conjunction with measurements of the behavior of the system with a non-adsorbing gas (i.e., He) to deduce the number of moles transferred and the number of moles taken up by the adsorbent. The cell was sealed off for ~30 seconds to monitor any slow adsorption processes that could produce time dependent changes in the number of moles taken up by the adsorbent. Accurate measurements of changes in sealed cell pressure and temperature were used in conjunction with measurements of the behavior of the system with a non-adsorbing gas (i.e., He) to quantify time dependent loading changes. The LDF approximation was then used to convert any observed change into an effective diffusion coefficient. The shortest time scale on which this type of analysis can be conducted is ~0.25-0.5 seconds. This provided an upper bound on the effective diffusion coefficient that can be measured. After holding the cell in a sealed state for ~30 seconds, the valve to the depressurization tank initially at ~1 psig (~7 kPag) was opened for ~10 seconds. During this time, the pressure in cell and depressurization tank equilibrated to about 25 psig (about 170 kPag). After the ~10-second long depressurization, the valve between the depressurization tank and cell was closed, and the cell was sealed off for approximately 10 more seconds while waiting to start a new cycle. Each subsequent cycle had the same valve timing as the first. Before the start of each cycle, the pressures in the feed and depressurization thanks were reset.

In the PSA measurements, $CO_2$ and $N_2$ appeared to be fully equilibrated in less than 0.25 seconds. As such, their diffusion coefficient was too fast to measure, providing a lower bound of ~$2 \cdot 10^{-11}$ $m^2/s$ for the effective $CO_2$ and $N_2$ diffusion coefficients in the DDR crystals in the as-synthesized film. With $CH_4$, the pressure changed in the cell in a manner that could be approximately fit using a LDF mass transfer coefficient. The effective $CH_4$ diffusion coefficient extracted from the LDF of the room temperature experiment was approximately $35 \times 10^{-13}$ $m^2/s$. This was approximately three times larger than the ZLC measurement at ~30° C. ZLC is a low pressure measurement, and it is known that effective diffusion coefficients can be pressure dependent.

After measuring diffusion coefficients in the as-synthesized film, the film was removed from the single complement PSA unit and selectivated with 3-methyl pentane using a procedure very similar to that described in Example 2. The selectivation was done at ~700 psig (~4.8 MPag) and ~290° C. for ~96 hours in an autoclave that was large enough to contain the steel plate.

After selectivating, the film was reloaded into the single complement PSA unit and remeasured. It was found that $CO_2$ and $N_2$ fully equilibrated in less than 0.25 seconds in a manner that was identical to the as-synthesized film. As such, there was no detectable change in the kinetics for $CO_2$ and $N_2$ diffusion coefficients from the selectivation process. The methane diffusion coefficient determined from the LDF fits dropped by factor of about 4.2 at both room temperature and 50° C. At room temperature, the effective $CH_4$ diffusion coefficient in the 3-methyl pentane selectivated DDR was approximately $8 \times 10^{-13}$ m$^2$/s.

Example 4

Selectivation of DDR Crystals by Shorter Term Exposure to High Concentrations of a Linear Alkanes at Temperatures Above 250° C.

This Example used the DDR material and selectivation process of Example 2. It was found that selectivating with n-octane at ~700 psig (~4.8 MPag) and ~290° C. for ~3 hours produced a loading of the n-octane greater than 4 wt % in the DDR crystals. This loading was greater than ~75% of the expected $q_s$ for n-octane and was undesirably large. Similar results were found for selectivation with n-hexane and n-heptane for exposure times longer than ~2 hours. To demonstrate that the loading could be reduced by shortening the exposure time, selectivation was performed with n-hexane at ~700 psig (~4.8 MPag) and ~290° C. for about ~0.75 hours. After the ~0.75 hours selectivation, it was found that the loading was ~1.25 wt %. ZLC measurements were performed on the sample, and it was found that the methane diffusivity had fallen below a level that could be detected by ZLC. The ZLC curve closely matched the instrumental resolution, and it was estimated that the $CH_4$ diffusivity had fallen below ~$10^{-14}$ m$^2$/s.

Example 5

Selectivation of DDR Crystals by Shorter Term Exposure to High Concentrations of a Methyl Branched Primary Alcohols at Above 250° C.

This Example used the DDR material and selectivation process of Example 2. Similar to Example 2, it was not a priori expected that a methyl branched primary alcohol could diffuse into DDR.

TGA studies of the uptake of methyl branched primary alcohols in selectivated DDR crystals are summarized in Table 2 below. In all of these TGA studies, the predominant weight loss occurred near ~400° C. This indicated some type of chemical bonding between the DDR and the methyl branched primary alcohols. It was hypothesized that the methyl branched primary alcohols had reacted with defects associated with hydroxyls and other defects in the DDR crystals. NMR studies of DDR and methyl branched primary alcohol selectivated DDR supported this hypothesis. Such a reaction enhances the stability of the selectivation.

TABLE 2

| Selectivating Molecule | Temp (° C.) | Pressure (psig) | Exposure Time (hrs) | Weight Lost in TGA (wt %) | Loading of Selectivating Molecule (wt %) |
|---|---|---|---|---|---|
| Treatment with no selectivating molecule | 290 | 700 | 40 | 0.3 | 0.0 |
| 2-methyl-1-propanol | 270 | 700 | 14 | 0.9 | 0.6 |
| 2-methyl-1-pentanol | 270 | 700 | 15 | 1.5 | 1.2 |
| 2-methyl-1-butanol | 270 | 700 | 14 | 1.3 | 1.0 |

To determine the impact on $CO_2$ and $CH_4$ transport from the methyl branched primary alcohol selectivation, a ballistic chromatographic procedure was used. In this method ~5-15 mg of adsorbent was loaded into a cell ~1 mm in diameter and ~1.5 cm long. The cell was then loaded into a chromatographic unit in a manner such that the connections to the cell did not cause any significant hydrodynamic back mixing when gases were flowed through the cell at flow rates of ~5-40 SCCM and pressures ranging from ~1 barg (~100 kPag) to ~5 barg (~500 kPag). To be able to interpret data, flow though the cell had to be essentially assumed to be "plug flow". Before beginning measurements, the adsorbent was conditioned between ~70° C. and ~225° C. in either flowing helium or flowing nitrogen.

To determine transport, a mass spectrometer having a time response faster than ~0.25 seconds was used to measure changes of either $CO_2$ or $CH_4$ concentrations flowing out of the cell. Gases used to probe the transport were mixtures of ~1-20% $CH_4$ in He or ~1-20% $CO_2$ in He. In this Example, the probe gasses were ~10% $CH_4$ in He and ~10% $CO_2$ in He. At the start of an experiment, He was flowed through the cell at either ~5 cm$^3$/min or ~25 cm$^3$/min. A valve was thrown, and the probe gas was flowed through the cell at the same rate as the He. After a prescribed period of time, the valve was thrown again, and helium was flowed through the cell at the original flow rate. In the design of the equipment, it was important that the velocity in the inlet streams remained approximately constant when the valve was thrown. There were several methods to do this, one of which being to have the inlet valve switch flow from a cell to a "dummy" path having about the same hydrodynamic resistance as the cell. In such a case, the He and probe gas would always be flowing and would only be switched from flowing through the cell and flowing through to the "dummy" flow path.

Much of the analysis of transport for $CH_4$ came from the shortest ~6-second time during which the probe gas flowed through the cell. Other lengths of time studied for the probe gas flow through the sample were ~30 seconds, ~1 minute, and ~2 minutes. Difference between results at ~5 cm$^3$/min and ~25 cm$^3$/min were used to assess whether $CO_2$ was fully equilibrated with the adsorbent before it passed through the cell. Analysis of data also relied on recording the time response of a blank cell.

Transport through the 2-methyl-1-propanol selectivated sample was compared with that of the base DDR using ballistic chromatography. For $CO_2$, there was a distinct breakthrough that was very similar in the 2-methyl-1-propanol selectivated sample and the base DDR. The shape and position of the front scaled with flow rate in a manner that indicated that $CO_2$ had fully equilibrated with samples even at the highest flow rates. As expected for full equilibration, changing the time for which gas was flowed through the cell from ~6 seconds to ~30 seconds did not appear to change the nature of the breakthrough front. This indicated that the $CO_2$ diffusion coefficients in the selectivated and base DDR samples were greater than $10^{-10}$ m$^2$/s. Comparing the $CH_4$ measurements of the selectivated and base DDR samples provided an estimate of the change in $CH_4$ diffusion from selectivation. Both modeling and direct comparison indicated that the 2-methyl-1-propanol selectivation reduced the effective $CH_4$ diffusion coefficient by at least a factor of 2.5.

Similar conclusions were made about the impact of 2-methyl-1-propanol selectivation of DDR films using the methods and materials of Example 3. Films that were selectivated with 2-methyl-1-propanol at ~700 psig (~4.8 MPag) and ~290° C. for ~44 hours had a ~3-fold reduction in the $CH_4$ diffusion coefficient with no significant impact on the observed kinetics for $CO_2$.

Example 6

Selectivation of DDR Crystals by Shorter Term Exposure to High Concentrations of Secondary Alcohols at Temperatures Above 250° C.

This Example used the DDR material and selectivation process of Example 2. TGA studies of the uptake of secondary alcohols in selectivated DDR crystals are summarized below in Table 3. Similar to the selectivation with methyl branched primary alcohols, the predominant weight loss occurred near ~400° C. This indicated some type of chemical bonding between the DDR and the secondary alcohols. It was hypothesized that the secondary alcohols reacted with defects associated with hydroxyls and other defects in the DDR crystals. Such a reaction appeared to enhance the stability of the selectivation.

TABLE 3

| Selectivating Molecule | Temp (° C.) | Pressure (psig) | Exposure Time (hrs) | Weight Lost in TGA (wt %) | Loading of Selectivating Molecule (wt %) |
|---|---|---|---|---|---|
| Treatment with no selectivating molecule | 290 | 700 | 40 | 0.3 | 0.0 |
| 2-propanol | 270 | 700 | 15 | 0.7 | 0.4 |
| 2-butanol | 270 | 700 | 14 | 1.8 | 1.5 |
| 2-pentanol | 270 | 700 | 14 | 0.5 | 0.2 |
| 2-hexanol | 270 | 700 | 14 | 0.6 | 0.3 |
| 2-heptanol | 270 | 700 | 14 | 0.7 | 0.4 |

Transport through the 2-hexanol selectivated sample was compared with that of the base DDR using ballistic chromatography. Studies indicated that the effective $CH_4$ diffusion coefficient fell by more than a factor of 10, while the $CO_2$ transport appeared to exhibit almost no change.

Example 7

Selectivation of DDR Films by Shorter Term Exposure to High Concentrations of Secondary Alcohols at Temperatures Above 250° C.

This Example used the DDR material and selectivation process of Example 3. Single component PSA measurements were used to assess transport in a ~250 micron thick DDR film before and after selectivating for ~44 hours at ~700 psig (~4.8 MPag) and ~290° C. with 2-hexanol. Comparison of $CO_2$ measurements taken before and after selectivation showed no detectable change in the $CO_2$ kinetics. Analysis of the PSA response placed a lower bound of ~$2 \times 10^{-11}$ $m^2/s$ on the effective $CO_2$ diffusion coefficient in the unselectivated and the 2-hexanol selectivated DDR film. With $CH_4$, the pressure changed in the cell in a manner that could be approximately fit using a LDF mass transfer coefficient. The effective $CH_4$ diffusion coefficient for DDR extracted from the LDF analysis of the room temperature experiment on the 2-hexanol selectivated DDR film was approximately $2 \times 10^{-13}$ $m^2/s$. LDF analysis showed that the effective $CH_4$ diffusion coefficient in the 2-hexanol selectivated DDR film was ~15 times smaller than that in the unselectivated film at both room temperature and 50° C.

Additional single component PSA measurements were used to assess transport in a ~250 micron thick DDR film before and after selectivating for ~14 hours at ~700 psig (~4.8 MPag) and ~290° C. with 2-octanol. Comparison of $CO_2$ measurements taken at room temperature before and after selectivation showed no detectable change in the $CO_2$ kinetics. Analysis of the PSA response placed a lower bound of ~$2 \times 10^{-11}$ $m^2/s$ on the effective $CO_2$ diffusion coefficient in the unselectivated and the 2-octanol selectivated DDR film. With $CH_4$, the pressure changed in the cell in a manner that could be approximately fit using a LDF mass transfer coefficient. The effective $CH_4$ diffusion coefficient for DDR extracted from the LDF analysis of the room temperature experiment on the 2-octanol selectivated DDR film was ~$0.3 \times 10^{-13}$ $m^2/s$. LDF analysis showed that the effective $CH_4$ diffusion coefficient in the 2-octanol selectivated DDR film was more than 100 times smaller than that in the unselectivated film.

Although the present invention has been described in terms of specific embodiments, it is not so limited. Suitable alterations/modifications for operation under specific conditions should be apparent to those skilled in the art. It is therefore intended that the following claims be interpreted as covering all such alterations/modifications as fall within the true spirit/scope of the invention.

What is claimed is:

1. A method for performing a gas separation, comprising:
contacting an adsorbent or membrane comprising an 8-member microporous material with a barrier compound under effective conditions to selectivate the adsorbent or membrane, the barrier compound having a minimum molecular dimension that is at least 0.4 Angstroms greater than the maximum dimension of the largest hard sphere that can diffuse along any direction of the adsorbent and a maximum dimension of about 25 Angstroms or less; wherein the effective conditions for contacting the adsorbent or membrane with a barrier compound comprise a temperature from about 50° C. to about 350° C. and a total pressure of about 100 psig (about 690 kPag) to about 2000 psig (about 13.8 MPag), wherein the barrier compound is present either as a liquid or as a gas with a partial pressure of the wherein compound that is at least about 10% of the saturation vapor pressure; wherein selectivation of the adsorbent or membrane comprises diffusion of at least one barrier compound molecule through a pores of the 8-member microporous material;
contacting the selectivated adsorbent or membrane with an input gas stream containing a first component and a second component to form a first gas stream enriched in the first component relative to the input gas stream; and
collecting a second gas stream enriched in the second component relative to the input gas stream.

2. The method of claim 1, wherein the 8-member ring microporous material is a DDR type zeolite, Sigma-1, ZSM-58, or a combination thereof.

3. The method of claim 1, wherein the barrier compound is a glycol, an amine, an alcohol, an alkane, a sulfur bearing compound, or a combination thereof, the barrier compound having a molecular weight of at least 50 g/mol.

4. The method of claim 1, wherein the barrier compound is ethylene glycol, triethylene glycol, methyldiethyl amine, dimethylethylamine, dimethyl disilane, n-hexane, 2-octanol, or a combination thereof.

5. The method of claim 1, wherein the first component is $CH_4$ or a combination of $CH_4$ and $H_2S$.

6. The method of claim 1, wherein the second component is $CO_2$, $N_2$, $H_2S$, or a combination thereof.

7. The method of claim 1, wherein the effective conditions for contacting the adsorbent or membrane with a barrier compound comprise a temperature of at least about 150° C.

8. The method of claim 1, wherein the first gas stream is a retentate stream and the second gas stream is a permeate stream.

9. The method of claim 1, wherein contacting the selectivated adsorbent with an input gas stream comprises adsorbing, by the selectivated adsorbent, at least a portion of the second component during the contacting, the method further comprising desorbing at least a portion of the adsorbed second component to form a desorbed second component portion, wherein the second gas stream comprises at least a portion of the desorbed second component portion.

10. The method of claim 1, further comprising desorbing at least a portion of the barrier compound during contacting the selectivated adsorbent or membrane with the input gas stream.

11. The method of claim 1, wherein the minimum dimension for the barrier compound is from about 4.05 Angstroms to about 5.65 Angstroms.

12. The method of claim 1, wherein the amount of barrier compound adsorbed by the microporous material is about 20% or less of the saturation loading ($q_s$).

13. A method for performing a gas separation in a swing adsorber unit, comprising:
    contacting an adsorbent comprising an 8-member ring zeolite in a swing adsorber unit with a barrier compound under effective conditions to selectivate the adsorbent, the 8-member ring zeolite being a DDR type zeolite, ZSM-58, Sigma-1, or a combination thereof; wherein the minimum molecular dimension of the barrier compound is at least 0.4 Angstroms greater than the maximum dimension of the largest hard sphere that can diffuse along any direction of the adsorbent; wherein the effective conditions for contacting the adsorbent or membrane with a barrier compound comprise a temperature from about 50° C. to about 350° C. and a total pressure of about 100 psig (about 690 kPag) to about 2000 psig (about 13.8 MPag), wherein the barrier compound is present either as a liquid or as a gas with a partial pressure of the wherein compound that is at least about 10% of the saturation vapor pressure; wherein selectivation of the adsorbent or membrane comprises diffusion of barrier compound molecules through the pores of the 8-member microporous material;
    contacting the selectivated adsorbent with an input gas stream containing a first component and a second component to form an output gas stream enriched in the first component relative to the input gas stream, the selectivated adsorbent adsorbing at least a portion of the second component during the contacting;
    desorbing at least a portion of the adsorbed second component to form a desorbed second component portion; and
    collecting a gas stream comprising at least a portion of the desorbed second component portion, the gas stream being enriched in the second component relative to the input gas stream.

14. The method of claim 13, wherein the swing adsorber unit is a pressure swing adsorber unit, a temperature swing adsorber unit, a rapid cycle pressure swing adsorber unit, or a rapid cycle temperature swing adsorber unit.

15. The method of claim 13, further comprising repeating said contacting the selectivated adsorbent, desorbing, and collecting for a plurality of cycles.

16. The method of claim 15, further comprising desorbing the barrier compound after the plurality of cycles of repeating said contacting, desorbing, and collecting.

17. The method of claim 13, wherein a methane diffusivity $D_{CH4}$ satisfies the following relationship:

$$D_{CH4} < 3 \times 10^{-13} * [t_{adsorb}/(4 \text{seconds})]^2 * [d_{crystal}/(15 \text{microns})]^2 \{\text{in m2/s}\}.$$

18. A method for performing a gas separation in a swing adsorber unit, comprising:
    contacting an adsorbent comprising a microporous material in a swing adsorber unit with a barrier compound under effective conditions to selectivate the adsorbent, the microporous material having pores characterized by a first dimension of a largest hard sphere that can diffuse along any direction in the pores and the barrier compound having a second dimension representing a minimum dimension of the compound, wherein the second dimension is between 10% greater than and 60% greater than the first dimension; wherein the effective conditions for contacting the adsorbent or membrane with a barrier compound comprise a temperature from about 50° C. to about 350° C. and a total pressure of about 100 psig (about 690 kPag) to about 2000 psig (about 13.8 MPag), wherein the barrier compound is present either as a liquid or as a gas with a partial pressure of the wherein compound that is at least about 10% of the saturation vapor pressure; wherein selectivation of the adsorbent or membrane comprises diffusion of barrier compound molecules through the pores of the microporous material;
    contacting the selectivated adsorbent with an input gas stream containing a first component and a second component to form an output gas stream enriched in the first component relative to the input gas stream, the selectivated adsorbent adsorbing at least a portion of the second component during the contacting;
    desorbing at least a portion of the adsorbed second component to form a desorbed second component portion; and
    collecting a gas stream comprising at least a portion of the desorbed second component portion, the gas stream being enriched in the second component relative to the input gas stream.

* * * * *